United States Patent
Chen et al.

(10) Patent No.: US 9,525,878 B2
(45) Date of Patent: Dec. 20, 2016

(54) OPTIMIZATIONS ON INTER-LAYER PREDICTION SIGNALLING FOR MULTI-LAYER VIDEO CODING

(71) Applicant: QUALCOMM Incorporated, San Diego, CA (US)

(72) Inventors: Jianle Chen, San Diego, CA (US); Ying Chen, San Diego, CA (US); Ye-Kui Wang, San Diego, CA (US); Krishnakanth Rapaka, San Diego, CA (US); Fnu Hendry, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 139 days.

(21) Appl. No.: 14/318,193

(22) Filed: Jun. 27, 2014

(65) Prior Publication Data
US 2015/0010050 A1    Jan. 8, 2015

Related U.S. Application Data

(60) Provisional application No. 61/845,299, filed on Jul. 11, 2013, provisional application No. 61/842,326, filed on Jul. 2, 2013.

(51) Int. Cl.
*H04N 19/105* (2014.01)
*H04N 19/196* (2014.01)
(Continued)

(52) U.S. Cl.
CPC .......... *H04N 19/105* (2014.11); *H04N 19/174* (2014.11); *H04N 19/196* (2014.11);
(Continued)

(58) Field of Classification Search
None
See application file for complete search history.

(56) References Cited

U.S. PATENT DOCUMENTS

| | | | |
|---|---|---|---|
| 2010/0158110 A1* | 6/2010 | Pandit .................. | H04N 19/105 375/240.12 |
| 2013/0188881 A1* | 7/2013 | Zhao .................... | H04N 19/463 382/232 |

(Continued)

FOREIGN PATENT DOCUMENTS

WO    WO-2014205067 A1    12/2014

OTHER PUBLICATIONS

U.S. Appl. No. 61/836,552 Specification.*
(Continued)

*Primary Examiner* — Tracy Y Li
*Assistant Examiner* — Mohammad J Rahman
(74) *Attorney, Agent, or Firm* — Knobbe, Martens, Olson & Bear, LLP

(57) ABSTRACT

A method of coding video data includes receiving one or more layers of video information. Each layer may include at least one picture. The method can include processing an indicator within at least one of a video parameter set (VPS), a sequence parameter set (SPS), or a picture parameter set (PPS) that indicates whether all direct reference layer pictures associated with the at least one of the video parameter set (VPS), the sequence parameter set (SPS), or the picture parameter set (PPS) are added to an inter-layer reference picture set. Based on the indicator, the method can further include refraining from further signaling inter-layer reference picture information in any video slice associated with the at least one of the video parameter set (VPS), the sequence parameter set (SPS), or the picture parameter set (PPS). Alternatively, based on the indicator, the method can further include adding to the inter-layer reference picture set all direct reference layer pictures for any video slice associated with the at least one of the video parameter set (VPS), (Continued)

the sequence parameter set (SPS), or the picture parameter set (PPS).

16 Claims, 9 Drawing Sheets

(51) Int. Cl.
| | |
|---|---|
| *H04N 19/187* | (2014.01) |
| *H04N 19/597* | (2014.01) |
| *H04N 19/70* | (2014.01) |
| *H04N 19/46* | (2014.01) |
| *H04N 19/30* | (2014.01) |
| *H04N 19/174* | (2014.01) |

(52) U.S. Cl.
CPC ............ *H04N 19/30* (2014.11); *H04N 19/46* (2014.11); *H04N 19/597* (2014.11); *H04N 19/70* (2014.11)

(56) References Cited

U.S. PATENT DOCUMENTS

| | | | | |
|---|---|---|---|---|
| 2013/0208792 A1* | 8/2013 | He | H04N 19/00569 | 375/240.12 |
| 2014/0140406 A1* | 5/2014 | Yu | H04N 19/00884 | 375/240.16 |
| 2014/0192859 A1* | 7/2014 | Haque | H04N 19/597 | 375/240.02 |
| 2014/0301451 A1* | 10/2014 | Deshpande | H04N 19/597 | 375/240.12 |
| 2014/0301452 A1* | 10/2014 | Deshpande | H04N 19/503 | 375/240.12 |
| 2014/0301453 A1* | 10/2014 | Deshpande | H04N 19/50 | 375/240.12 |
| 2015/0010051 A1* | 1/2015 | Chen | H04N 19/105 | 375/240.02 |
| 2016/0134868 A1* | 5/2016 | He | H04N 19/112 | 375/240.02 |
| 2016/0261878 A1* | 9/2016 | Deshpande | H04N 19/70 | |

OTHER PUBLICATIONS

U.S. Appl. No. 61/837,116 Specification.*
U.S. Appl. No. 61/840,380 Specification.*
Chen J., et al., "Scalable HEVC (SHVC) Working Draft 2", 104. MPEG Meeting; Apr. 22, 2013-Apr. 26, 2013; Incheon; (Motion Picture Expert Group or ISO/IEC JTC1/SC29/WG11), No. N13570, Jun. 25, 2013 (Jun. 25, 2013), pp. 1-65, XP030020318.
Chen J., et al., "MV-HEVC/SHVC HLS: On Inter layer Prediction Signaling", 5. JCT-3V Meeting; Jul. 27, 2013-Aug. 2, 2013; Vienna; (The Joint Collaborative Team on 3D Video Coding Extension Development of ISO/IEC JTC1/SC29/WG11 and ITU-T SG.16); URL: http://phenix.int-evry.fr/jct2/,, No. JCT3V-E0084-v2, Jul. 29, 2013 (Jul. 29, 2013), pp. 1-5, XP030131088.
Choi B., et al., "Parameter set design for redundancy removal", 13. JCT-VC Meeting; 104. MPEG Meeting; Apr. 18, 2013-Apr. 26, 2013; Incheon; (Joint Collaborative Team on Video Coding of ISO/IEC JTC1/SC29/WG11 and ITU-T SG.16); URL: http://wftp3.itu.int/av-arch/jctvc-site/,, No. JCTVC-M0165, Apr. 9, 2013 (Apr. 9, 2013), pp. 1-5, XP030114122.
Deshpande (Sharp) S., "On Implicit Signaling of Scalability Dimension Identifiers", 12. JCT-VC Meeting; 103. MPEG Meeting; Jan. 14, 2013-Jan. 23, 2013; Geneva; (Joint Collaborative Team on Video Coding of ISO/IEC JTC1/SC29/WG11 and ITU-T SG.16); URL: http:/ /wftp3. itu. int/av-arch/jctvc-site/,, No. JCTVC-L0209, Jan. 8, 2013 (Jan. 8, 2013), pp. 1-5; XP030113697.
Deshpande (Sharp) S: "Comments on SHVC and MV-HEVC", 14. JCT-VC Meeting; Jul. 25, 2013-Aug. 2, 2013; Vienna; (Joint Collaborative Team on Video Coding of ISO/IEC JTC1/SC29/WG11 and ITU-T SG.16) URL: http://wftp3.itu.int/av-arch/jctvc-site/,, No. JCTVC-N0195, Jul. 16, 2013 (Jul. 16, 2013), pp. 1-7; XP030114688.
Deshpande (Sharp) S., "On Layer Dependency Signaling", 12. JCT-VC Meeting; 103. MPEG Meeting; Jan. 14, 2013-Jan. 23, 2013; Geneva; (Joint Collaborative Team on Video Coding of ISO/IEC JTC1/SC29/WG11 and ITU-T SG.16) URL: http://wftp3.itu.int/av-arch/jctvc-site/,,No. JCTVC-L0210, Jan. 8, 2013 (Jan. 8, 2013), pp. 1-8, XP030113698.
Hannuksela M M., et al., "JCT-3V AHG Report: 3D high level syntax (AHG7)", 4. JCT-3V Meeting; Apr. 20, 2013-Apr. 26, 2013; Geneva; (The Joint Collaborative Team on 3D Video Coding Extension Development of ISO/IEC JTC1/SC29/WG11 and ITU-T SG.16) URL: http://phenix.int-evry.fr/jct2/,, No. JCT3V-D0007, Apr. 28, 2013 (Apr. 20, 2013), pp. 1-2; XP030130681.
Hannuksela M M., et al., "JCT-VC AHG report: High-level syntax for HEVC extensions (AHG9)", 13. JCT-VC Meeting; 104. MPEG Meeting; Apr. 18, 2013-Apr. 26, 2013; Incheon; (Joint Collaborative Team on Video Coding of ISO/IEC JTC1/SC29/WG11 and ITU-T SG.16) URL: http://wftp3.itu.int/av-arch/jctvc-site/,, No. JCTVC-M0009, Apr. 17, 2013 (Apr. 17, 2013), pp. 1-5, XP030113972.
He Y., et al., "MV-HEVC/SHVC HLS: On SHVC High Level Syntax", 5. JCT-3V Meeting; Jul. 27, 2013-Aug. 2, 2013; Vienna; (The Joint Collaborative Team on 3D Video Coding Extension Development of ISO/IEC JTC1/SC29/WG11 and ITU-T SG.16) URL: http://phenix.int-evry.fr/jct2/,, No. JCT3V-E0097, Jul. 17, 2013 (Jul. 17, 2013), pp. 1-7, XP030131103.
International Search Report and Written Opinion—PCT/US2014/ 044902—ISA/EPO—Oct. 31, 2014.
Kang J W., et al., "MV-HEVC/SHVC HLS: On signaling of inter-layer RPS in slice segment header", 14. JCT-VC Meeting; Jul. 25, 2013-Aug. 2, 2013; Vienna; (Joint Collaborative Team on Video Coding of ISO/IEC JTC1/SC29/WG11 and ITU-T SG.16) URL: http://wftp3.itu.int/av-arch/jctvc-site/,, No. JCTVC-N0154, Jul. 15, 2013 (Jul. 15, 2013), pp. 1-3, XP030114627.
Rusert T., "On VPS extension design", 12. JCT-VC Meeting; 103. MPEG Meeting; Jan. 14, 2013-Jan. 23, 2013; Geneva; (Joint Collaborative Team on Video Coding of ISO/IEC JTC1/SC29/ WG11 and ITU-T SG.16); URL: http://wftp3.itu.int/av-arch/jctvc-site/,,No. JCTVC-L0138, Jan. 7, 2013 (Jan. 7, 2013), pp. 1-7, XP030113626.
Tech G., et al., "Study Text of ISO/IEC 23008-2:201x/PDAM2 HEVC Multiview Extensions",104. MPEG Meeting; Apr. 22, 2013-Apr. 26, 2013; Incheon; (Motion Picture Expert Group or ISO/IEC JTC1/SC29/WG11),, No. N13572, Jun. 19, 2013 (Jun. 19, 2013), pp. 1-62; XP030020320.
Wang Y-K et al., "AHG9: Signaling and derivation of inter-layer RPS for HEVC 3DV and scalable extensions", 13. JCT-VC Meeting; 104. MPEG Meeting; Apr. 18, 2013-Apr. 26, 2013; Incheon; (Joint Collaborative Team on Video Coding of ISO/IEC JTC1/ SC29/WG11 and ITU-T SG.16); URL: http://wftp3.itu.int/av-arch/ jctvc-site/,, No. JCTVC-M0269, Apr. 9, 2013 (Apr. 9, 2013), pp. 1-5, XP030114226.
Xu J., et al., "MV-HEVC/SHVC HLS: On inter-layer prediction related syntax", 14. JCT-VC Meeting; Jul. 25, 2013-Aug. 2, 2013; Vienna; (Joint Collaborative Team on Video Coding of ISO/IEC JTC1/SC29/WG11 and ITU-T SG.16); URL: http://wftp3.itu.int/av-arch/jctvc-site/,, No. JCTVC-N0081, Jul. 14, 2013 (Jul. 14, 2013), pp. 1-8, XP030114526.
Chen J., et al., "SHVC Working Draft 2", Joint Collaborative Team on Video Coding (JCT-VC) of ITU-T SG16 WP3 and ISO/IEC JTC1/SC29/WG11 13th Meeting: Incheon, KR, Apr. 18-26, 2013, document No. JCTVC-M1008_v3, 67 pages.
Tech G., et al., "MV-HEVC Draft Text 4", Joint Collaborative Team on 3D Video Coding Extension Development of ITU-T SG 16 WP 3 and ISO/IEC JTC 1/SC 29/WG 11 4th Meeting: Incheon, KR, Apr. 20-26, 2013, document No. JCT3V-D1004-v4, 63 pages.

* cited by examiner

OPTIMIZATIONS ON INTER-LAYER PREDICTION SIGNALLING FOR MULTI-LAYER VIDEO CODING

CROSS REFERENCE TO RELATED APPLICATIONS

This application claims benefit to U.S. Provisional Patent Application No. 61/842,326 entitled "OPTIMIZATIONS ON INTER-LAYER PREDICTION SIGNALLING FOR MULTI-LAYER VIDEO CODING" filed on Jul. 2, 2013, and to U.S. Provisional Patent Application No. 61/845,299 entitled "OPTIMIZATIONS ON INTER-LAYER PREDICTION SIGNALLING FOR MULTI-LAYER VIDEO CODING" filed on Jul. 11, 2013, the disclosures of which are hereby incorporated by reference in their entirety.

TECHNICAL FIELD

This disclosure generally relates to video coding and compression and, in particular, to scalable video coding (SVC), multi-view video coding and 3D video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs), and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which may be quantized. The quantized transform coefficients may be initially arranged in a two-dimensional array and scanned in order to produce a one-dimensional vector of transform coefficients, and entropy coding may be applied to achieve even more compression.

SUMMARY

In accordance with some embodiments, an apparatus configured to encode video information includes a processor and a memory. The memory can be configured to store one or more layers (e.g., views) of video information, each layer comprising at least one picture. The processor is in communication with the memory. The processor may be configured to process an indicator within at least one of a video parameter set (VPS), a sequence parameter set (SPS), or a picture parameter set (PPS) that indicates whether all direct reference layer pictures associated with the at least one of the video parameter set (VPS), the sequence parameter set (SPS), or the picture parameter set (PPS) are added to an inter-layer reference picture set. Based on the indicator (e.g., if the indicator indicates that all associated direct reference layer pictures are added to the inter-layer reference picture set), the processor may be configured to refrain from further signaling inter-layer reference picture information in any video slice associated with the at least one of the one video parameter set (VPS), the sequence parameter set (SPS), or the picture parameter set (PPS).

In some embodiments, the indicator comprises a flag. In some embodiments, the processor may be configured to process the indicator by at least generating the indicator.

In some embodiments, the processor is configured to process the indicator by signaling the indicator in one of the video parameter set (VPS), the sequence parameter set (SPS), the picture parameter set (PPS), or any combination thereof.

In some embodiments, the processor is configured to refrain from further signaling inter-layer reference picture information by refraining from including further syntax elements for inter-layer reference picture information signaling in a slice header of any video slice. The direct reference layer pictures may comprise pictures in layers specified in the video parameter set for each layer within each temporal sub-layer.

In some embodiments, the apparatus further comprises a video encoder. The apparatus may further comprise at least one of a digital television, a digital direct broadcast system, a wireless broadcast system, a personal digital assistant (PDA), laptop or a desktop computer, a digital camera, a digital recording device, a digital media player, a video gaming device, a video game console, a cellular or a satellite radio telephone, and a video teleconferencing device that comprises the memory and the processor.

In another embodiment, an apparatus configured to decode video information includes a processor and a memory. The memory can be configured to store one or more layers (e.g., views) of video information, each layer comprising at least one picture. The processor is in communication with the memory. The processor may be configured to process an indicator within at least one of a video parameter set (VPS), a sequence parameter set (SPS), or a picture parameter set (PPS) that indicates whether all direct reference layer pictures associated with the at least one of the video parameter set (VPS), the sequence parameter set (SPS), or the picture parameter set (PPS) are added to an inter-layer reference picture set. Based on the indicator (e.g., if the indicator indicates that all associated direct reference layer pictures are added to the inter-layer reference picture set), the processor may be configured to add to the inter-layer reference picture set all direct reference layer pictures for any video slice associated with the at least one of the video parameter set (VPS), the sequence parameter set (SPS), or the picture parameter set (PPS).

In some embodiments, the indicator comprises a flag. In some embodiments, the processor may be configured to process the indicator by at least receiving the indicator.

In some embodiments, the processor is configured to process the indicator by receiving the indicator within one of the video parameter set (VPS), the sequence parameter set (SPS), the picture parameter set (PPS), or any combination thereof.

In some embodiments, the processor is configured to add to the inter-layer reference picture set all direct reference layer pictures for any video slice associated with the at least one of the video parameter set (VPS), the sequence parameter set (SPS), or the picture parameter set (PPS) without receiving any further syntax elements for inter-layer signaling in a slice header of any video slice. The direct reference layer pictures may comprise pictures in layers specified in the video parameter set for each layer within each temporal sub-layer.

In some embodiments, the apparatus further comprises a video decoder. The apparatus may further comprise at least one of a digital television, a digital a direct broadcast system, a wireless broadcast system, a personal digital assistant (PDA), a laptop or a desktop computer, a digital camera, a digital recording device, a digital media player, a video gaming device, a video game console, a cellular or a satellite radio telephone, and a video teleconferencing device that comprises the memory and the processor.

In another embodiment, a method of encoding video information includes receiving one or more layers of video information, each layer comprising at least one picture; processing an indicator within at least one of a video parameter set (VPS), a sequence parameter set (SPS), or a picture parameter set (PPS) that indicates whether all direct reference layer pictures associated with the at least one of the video parameter set (VPS), the sequence parameter set (SPS), or the picture parameter set (PPS) are added to an inter-layer reference picture set; and, based on the indicator (e.g., if the indicator indicates that all associated direct reference layer pictures are added to the inter-layer reference picture set), refraining from further signaling inter-layer reference picture information in any video slice associated with the at least one of the video parameter set (VPS), the sequence parameter set (SPS), or the picture parameter set (PPS).

In another embodiment, a method of decoding video information includes receiving one or more layers of video information, each layer comprising at least one picture; processing an indicator within at least one of a video parameter set (VPS), a sequence parameter set (SPS), or a picture parameter set (PPS) that indicates whether all direct reference layer pictures associated with the at least one of the video parameter set (VPS), the sequence parameter set (SPS), or the picture parameter set (PPS) are added to an inter-layer reference picture set; and, based on the indicator (e.g., if the indicator indicates that all associated direct reference layer pictures are added to the inter-layer reference picture set), adding to the inter-layer reference picture set all direct reference layer pictures for any video slice associated with the at least one of the video parameter set (VPS), the sequence parameter set (SPS), or the picture parameter set (PPS).

In another embodiment, a video decoding apparatus may include means for storing one or more layers of video information, each layer comprising at least one picture; means for processing an indicator within at least one of a video parameter set (VPS), a sequence parameter set (SPS), or a picture parameter set (PPS) that indicates whether all direct reference layer pictures associated with the at least one of the video parameter set (VPS), the sequence parameter set (SPS), or the picture parameter set (PPS) are added to an inter-layer reference picture set; means for, based on the indicator (e.g., if the indicator indicates that all associated direct reference layer pictures are added to the inter-layer reference picture set), adding to the inter-layer reference picture set all direct reference layer pictures for any video slice associated with the at least one of the video parameter set (VPS), the sequence parameter set (SPS), or the picture parameter set (PPS).

In another embodiment, a non-transitory computer readable medium having stored thereon code that when executed causes an apparatus to: store one or more layers of video information, each layer comprising at least one picture; process an indicator within at least one of a video parameter set (VPS), a sequence parameter set (SPS), or a picture parameter set (PPS) that indicates whether all direct reference layer pictures associated with the at least one of the video parameter set (VPS), the sequence parameter set (SPS), or the picture parameter set (PPS) are added to an inter-layer reference picture set; and, based on the indicator (e.g., if the indicator indicates that all associated direct reference layer pictures are added to the inter-layer reference picture set), add to the inter-layer reference picture set all direct reference layer pictures for any video slice associated with the at least one video parameter set (VPS), sequence parameter set (SPS), or picture parameter set (PPS).

DETAILED DESCRIPTION

Figure 1:
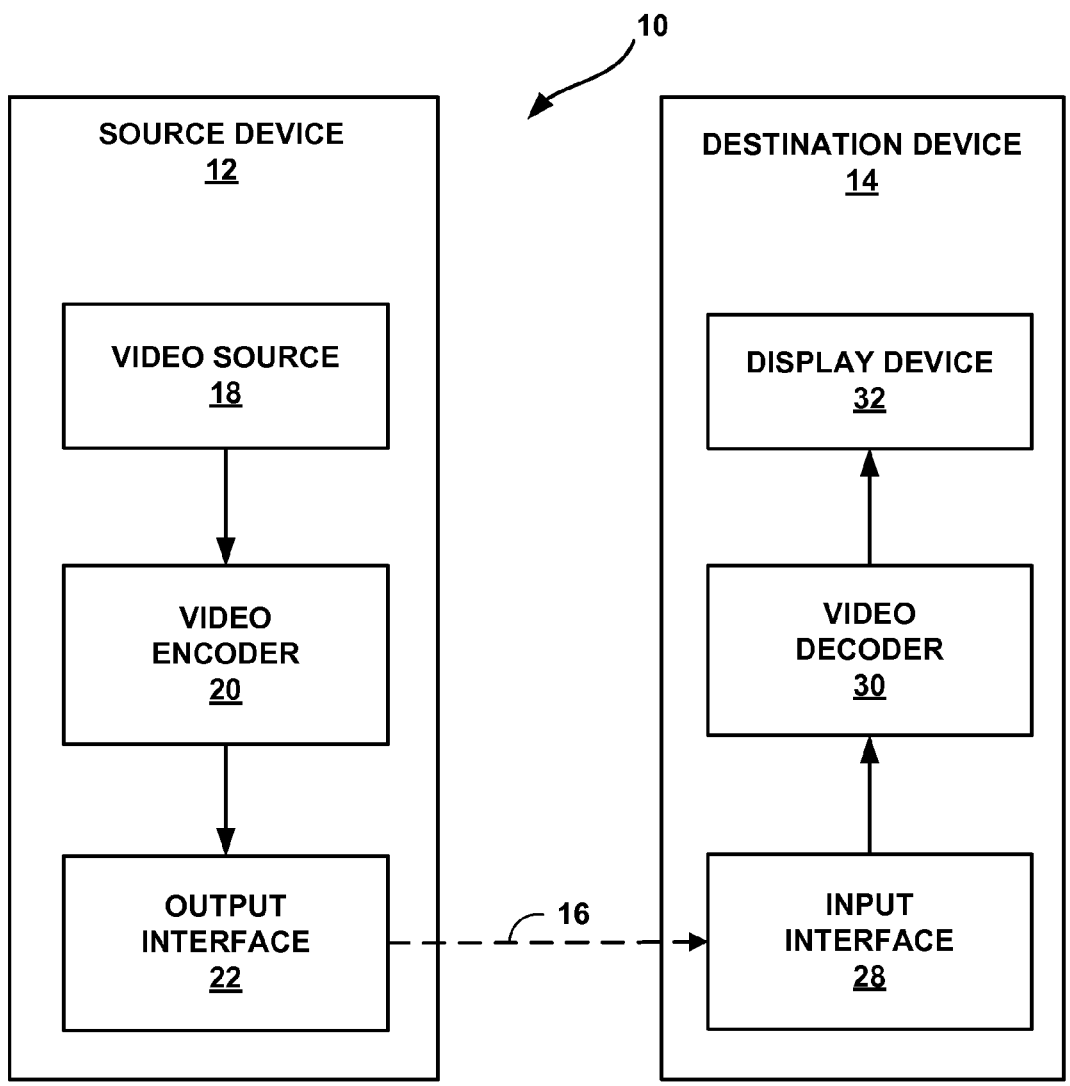
FIG. 1 is a block diagram illustrating an example video encoding and decoding system that may utilize techniques in accordance with aspects described in this disclosure.

The techniques described in this disclosure are generally related to scalable video coding (SVC) and/or multiview/3D video coding. For example, the techniques may be related to, and used with or within a High Efficiency Video Coding (HEVC) scalable video coding (SVC) extension. In SVC, there can be multiple layers of video information. A layer at the very bottom level or at the lowest level of the video information may serve as a base layer (BL) or reference layer (RL), and the layer at the very top level or at the highest level of the video information may serve as an enhanced layer (EL). The "enhanced layer" may be considered as being synonymous with an "enhancement layer," and these terms may be used interchangeably. Layers between the BL and EL may serve as ELs and/or RLs. For instance, a given layer may be an EL for a layer below (e.g., that precedes) the given layer, such as the base layer or any intervening enhancement layer. Further, the given layer may also serve as a reference layer for an enhancement layer above (e.g., subsequent to) the given layer. Any given layer in between the base layer (e.g., the lowest layer having, for example, a layer identification (ID) set or equal to "1") and the top layer (or the highest layer) may be used as a reference for inter-layer prediction by a layer higher relative to the given layer and may be determined using a layer lower to the given layer as a reference for inter-layer prediction.

For purposes of illustration only, the techniques described in the disclosure may be described with examples including only two layers (e.g., lower level layer such as the reference layer, and a higher level layer such as the enhanced layer). It should be understood that the examples described in this disclosure can be extended to examples with multiple base or reference layers and enhancement layers as well. In addition, for ease of explanation, the following disclosure mainly uses the terms "frames" or "blocks." However, these terms are not meant to be limiting. For example, the techniques described below can be used with different video units, such as blocks (e.g., CU, PU, TU, macroblocks, etc.), slices, pictures, etc.

Inter-layer prediction (ILP) for HEVC extensions generally have problems and shortcomings with respect to signaling of inter-layer reference picture information in a slice header. For example, signaling of inter-layer reference picture information in a slice header is needed for non-base layer pictures as long as the number of direct reference layers is greater than 0. A reference layer constitutes a direct reference layer to a given enhancement layer based on the given enhancement layer utilizing the reference layer for inter-layer prediction. However, for many typical scenarios, there may not be a need to change the inter-layer reference picture information slice by slice (e.g., the inter-layer reference picture information may remain the same from one slice header to the next slice header) and/or there may not be any need to signal any inter-layer reference picture information in the slice header. In these situations, the signaling bits used for inter-layer prediction in the slice header become unnecessary and the inclusion of these signaling bits reduces coding efficiency. These situations include, in typical multiview video coding scenarios, situations in which the direct reference layer pictures in the inter-layer reference picture set (RPS), as specified in video parameter set (VPS), may all be used for inter-layer prediction and the direct reference layer pictures may all be inserted into at least one reference picture list of the current picture. Additionally or alternatively, when the number of direct reference layers equals a number of active reference layer pictures associated with the video information, there is no need to signal inter-layer prediction.

In some embodiments, a system and method are provided that support two or more layers, yet provide low coding (e.g., decoding, encoding) complexity. The techniques described herein also apply to multiview or 3DV extensions of HEVC and similar scalable, multiview, and/or 3DV coding scenarios (as a layer may also be considered as a view or a texture or depth part of a view) based on any other coding framework, e.g., H.264/AVC.

To reduce coding complexity with video information having two or more layers, an indicator may be provided that indicates whether all direct reference layer pictures associated with at least one video parameter set (VPS), sequence parameter set (SPS), or picture parameter set (PPS) are added to an inter-layer reference picture set. For example, based on the indicator indicating that all direct reference layer pictures associated with at least one of the video parameter set (VPS), the sequence parameter set (SPS), or the picture parameter set (PPS) are added to an inter-layer reference picture set, a video encoder may refrain from signaling inter-layer reference picture information in any video slice associated with the at least one of the video parameter set (VPS), the sequence parameter set (SPS), or the picture parameter set (PPS). In some embodiments, a video encoder may process the indicator by signaling the indicator in one of the video parameter set (VPS), the sequence parameter set (SPS), the picture parameter set (PPS), or any combination thereof. In some embodiments, a video encoder may refrain from further signaling inter-layer reference picture information by refraining from including any further syntax element for inter-layer signaling in a slice header of any video slice.

In some embodiments, based on the indicator indicating that all direct reference layer pictures associated with the at least one of the video parameter set (VPS), the sequence parameter set (SPS), or the picture parameter set (PPS) are added to an inter-layer reference picture set, a video decoder may add to the inter-layer reference picture set all direct reference layer pictures for any video slice associated with the at least one of the video parameter set (VPS), the sequence parameter set (SPS), or the picture parameter set (PPS). In addition, a video decoder may process the indicator by receiving the indicator from within one of the video parameter set (VPS), the sequence parameter set (SPS), the picture parameter set (PPS), or any combination thereof. In some embodiments, a video decoder may add to the inter-layer reference picture set all direct reference layer pictures for any video slice associated with the at least one of the video parameter set (VPS), the sequence parameter set (SPS), or the picture parameter set (PPS) without receiving any further syntax element for inter-layer signaling in a slice header of any video slice.

Video Coding Standards

Certain embodiments described herein relate to inter-layer prediction for scalable video coding in the context of advanced video codecs, such as HEVC (High Efficiency Video Coding). More specifically, the present disclosure relates to systems and methods for improved performance of inter-layer prediction in scalable video coding (SVC), multiview video coding and/or 3D video coding extension of HEVC. In the description below, H.264/AVC techniques related to certain embodiments are described; the HEVC standard and related techniques are also discussed. While certain embodiments are described herein in the context of the HEVC and/or H.264 standards, one having ordinary skill in the art may appreciate that systems and methods disclosed herein may be applicable to any suitable video coding standard. For example, embodiments disclosed herein may be applicable to one or more of the following standards: ITU-T H.261, ISO/IEC MPEG-1 Visual ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

Scalable video coding (SVC) may be used to provide quality (also referred to as signal-to-noise (SNR)) scalability, spatial scalability and/or temporal scalability. For example, in one embodiment, a reference layer (e.g., a base layer) includes video information sufficient to display a video at a first quality level and the enhancement layer includes additional video information relative to the reference layer such that the reference layer and the enhancement layer together include video information sufficient to display the video at a second quality level higher than the first level (e.g., less noise, greater resolution, better frame rate, etc.). An enhanced layer may have different spatial resolution than base layer. For example, the spatial aspect ratio between EL and BL can be 1.0, 1.5, 2.0 or other different ratios. In other words, the spatial aspect of the EL may equal 1.0, 1.5, or 2.0 times the spatial aspect of the BL. In some examples, the scaling factor of the EL may be greater than the BL. For example, a size of pictures in the EL may be greater than a size of pictures in the BL. In this way, it may be possible, although not a limitation, that the spatial resolution of the EL is larger than the spatial resolution of the BL.

In the SVC extension for H.264, prediction of a current block may be performed using the different layers that are provided for SVC. Such prediction may be referred to as inter-layer prediction. Inter-layer prediction methods may be utilized in SVC in order to reduce inter-layer redundancy. Some examples of inter-layer prediction may include inter-layer intra prediction, inter-layer motion prediction, inter-layer mode prediction, and inter-layer residual prediction. Inter-layer intra prediction uses the reconstruction of collocated blocks in the base layer to predict the current block in the enhancement layer. Inter-layer motion prediction uses motion of the base layer to predict motion in the enhancement layer. Inter-layer mode prediction predicts the mode in the enhancement layer based on the mode in the base layer. Inter-layer residual prediction uses the residue of the base layer to predict the residue of the enhancement layer.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

FIG. 1 is a block diagram illustrating an example video encoding and decoding system that may utilize techniques in accordance with aspects described in this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In addition, in some embodiments, system 10 can be implemented in a single device. For example, any such single device, including a telephone handset, may comprise both source device 12 and destination device 14, as well as computer-readable medium 16. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. In some embodiments, a wireless communication device, such as a cellular telephone, can comprise source device 12, including video source 18, video encoder 20, and output interface 22. Destination device 14 includes input interface 28, video decoder 30, and display device 32. In some embodiments, a wireless communication device, such as a cellular telephone, can comprise destination device 14, including input interface 28, video decoder 30, and display device 32. For example, in some cases, a single wireless communication device can comprise both source device 12 and destination device 14. In accordance with this disclosure, video encoder 20 of source device 12 may be configured to apply the techniques for coding a bitstream including video data conforming to multiple standards or standard extensions. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for determining candidates for a candidate list for motion vector predictors for a current block may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. For example, in some embodiments in which source device 12 and destination device 14 are implemented as a single device, such as a wireless handset, computer-readable medium 16 can include any storage media. In some examples, a network server (not shown) may receive encoded video data from source device 12 and provide the encoded video data to destination device 14, e.g., via network transmission, direct wired communication, etc. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard, and may conform to the HEVC Test Model (HIM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard, including but not limited to any of the standards listed above. Other examples of video coding standards include MPEG-2 and ITU-T H.263. In some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

The JCT-VC is working on development of the HEVC standard. The HEVC standardization efforts are based on an evolving model of a video coding device referred to as the HEVC Test Model (HIM). The UM presumes several additional capabilities of video coding devices relative to existing devices according to, e.g., ITU-T H.264/AVC. For example, whereas H.264 provides nine intra-prediction encoding modes, the UM may provide as many as thirty-three intra-prediction encoding modes.

In general, the working model of the UM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, the CU is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, the TU may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up," "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks may not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization is a broad term intended to have its broadest ordinary meaning. In one embodiment, quantization refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

Figure 2:
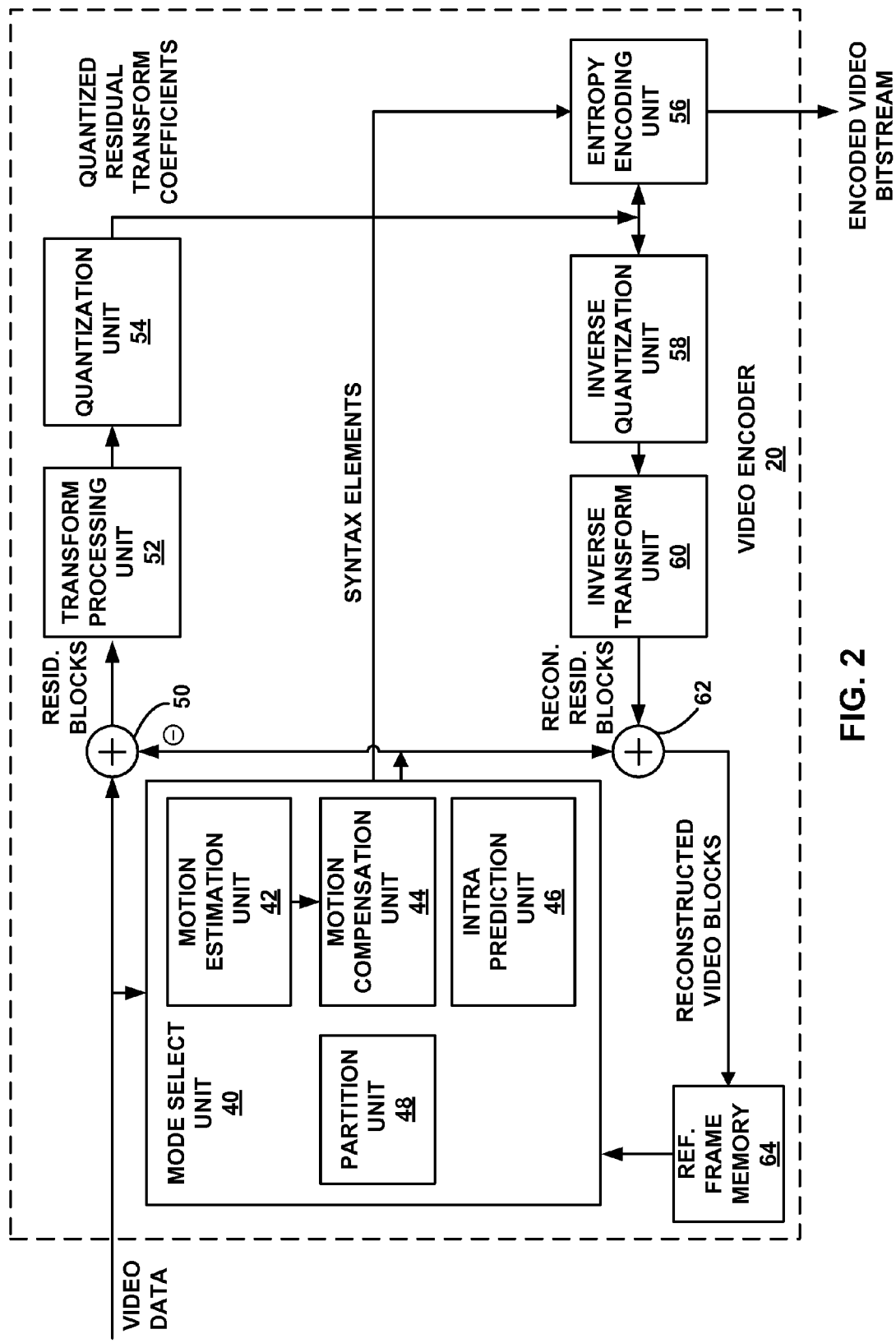
FIG. 2 is a block diagram illustrating an example of a video encoder that may implement techniques in accordance with aspects described in this disclosure.

FIG. 2 is a block diagram illustrating an example of a video encoder that may implement techniques in accordance with aspects described in this disclosure. Video encoder 20 may be configured to perform any or all of the techniques of this disclosure. For example, the techniques described in this disclosure, including the methods described below with respect to FIGS. 7 and 8, may be shared among the various components of video encoder 20. In some examples, in addition to or instead of, a processor (not shown) may be configured to perform any or all of the techniques described in this disclosure.

Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 1, video encoder 20 includes mode select unit 40, reference frame memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict or calculate a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

Figure 3:
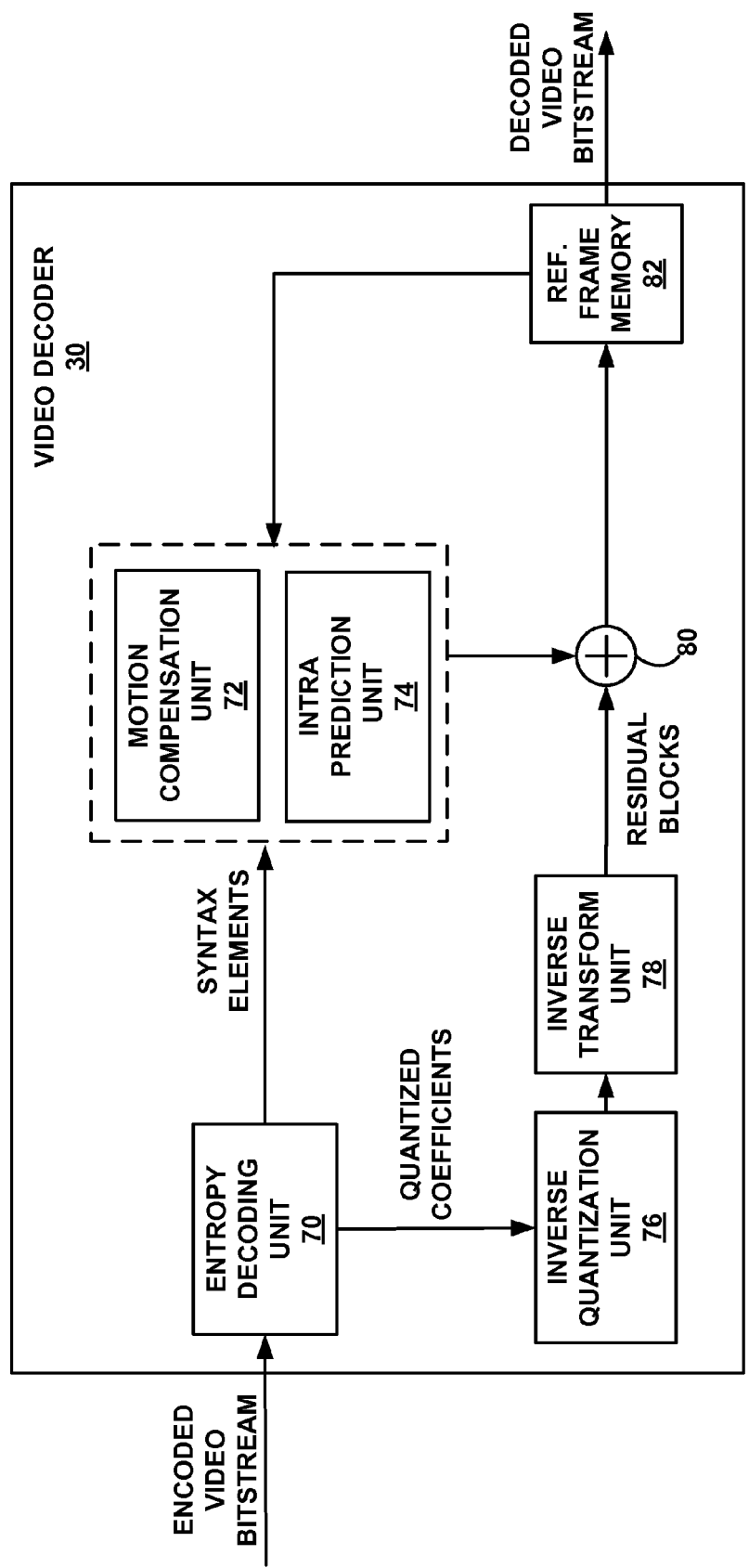
FIG. 3 is a block diagram illustrating an example of a video decoder that may implement techniques in accordance with aspects described in this disclosure.

FIG. 3 is a block diagram illustrating an example of a video decoder that may implement techniques in accordance with aspects described in this disclosure. Video decoder 30 may be configured to perform any or all of the techniques of this disclosure, including the methods described below with respect to FIGS. 7 and 8. As one example, motion compensation unit 72 and/or intra prediction unit 74 may be configured to perform any or all of the techniques described in this disclosure. However, aspects of this disclosure are not so limited. In some examples, the techniques described in this disclosure may be shared among the various components of video decoder 30. In some examples, in addition to or instead of, a processor (not shown) may be configured to perform any or all of the techniques described in this disclosure.

In the example of FIG. 3, video decoder 30 includes an entropy decoding unit 70, motion compensation unit 72, intra prediction unit 74, inverse quantization unit 76, inverse transformation unit 78, reference frame memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (e.g., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 92. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, e.g., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference frame memory 82 also stores decoded video for later presentation on a display device, such as display device 32 of FIG. 1.

Motion Compensation in HEVC

As mentioned above, HEVC is the next generation of video coding standard. In general, HEVC follows the framework of previous video coding standards. The motion compensation loop of HEVC can be kept the same as that in H.264/AVC, i.e., the reconstruction of the current frame Î equals de-quantized coefficients r plus temporal prediction P:

$$\hat{I}=r+P \tag{1}$$

where P indicates uni-directional prediction for P frames or slices or bi-directional prediction for B frames or slices.

The unit of motion compensation in HEVC can be different from that in previous video coding standards. In fact, the concept of macroblock in previous video coding standards does not exist in HEVC. Instead, the macroblock concept is replaced by a highly flexible hierarchical structure based on a generic quadtree scheme. Within this scheme, three types of blocks, i.e., Coding Unit (CU), Prediction Unit (PU), and Transform Unit (TU), are defined. CU is the basic unit of region splitting. CU is analogous to the concept of macroblock, but a CU does not restrict the maximum size and a CU allows recursive splitting into four equal size CUs to improve the content adaptivity. PU is the basic unit of inter/intra prediction and a PU may contain multiple arbitrary shape partitions in a single PU to effectively code irregular image patterns. TU is the basic unit of transform. A TU can be defined independently from the PU; however, the size of a TU is limited to the CU which the TU belongs to. This separation of the block structure into three different concepts allows each block structure to be optimized according to its role, which results in the improved coding efficiency.

Scalable Video Coding

Figure 4:
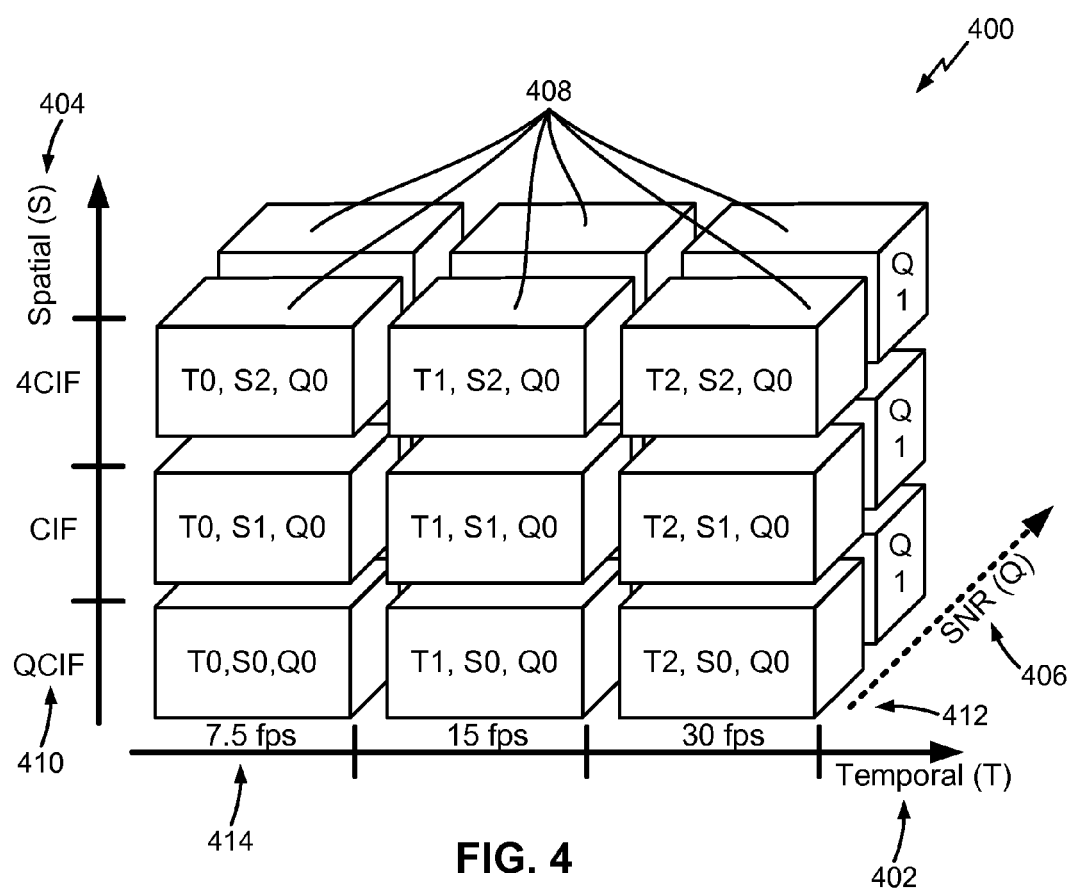
FIG. 4 is a block diagram illustrating scalabilities in three different dimensions according to aspects of this disclosure.

An example of scalabilities 400 in different dimensions is shown in FIG. 4. In the example, scalabilities are enabled in three dimensions 402, 404, 406. In a time dimension 402, frame rates, for example, with 7.5 Hz, 15 Hz or 30 Hz can be supported by temporal scalability (T). When spatial scalability (S) 404 is supported, different resolutions, for example, such as QCIF, CIF and 4CIF are enabled. For each specific spatial resolution and frame rate, the SNR (Q) layers 406 can be added to improve the picture quality. Bitstreams from each layer 402, 404, 406 can be multiplexed together into a single bitstream. Once video content has been encoded in such a scalable way, an extractor tool may be used to adapt the actual delivered content according to application requirements, which are dependent e.g., on the clients or the transmission channel. In the example shown in FIG. 4, each cubic 408 contains the pictures with the same frame rate (temporal level), spatial resolution and SNR layers. Better representation can be achieved by adding those cubes 408 (pictures) in any dimension 402, 404, 406. Combined scalability is supported when there are two, three or even more scalabilities enabled.

According to the SVC specification, the pictures with the lowest spatial 410 and quality 412 layer are compatible with H.264/AVC, and the pictures at the lowest temporal level 414 form the temporal base layer, which can be enhanced with pictures at higher temporal levels. In addition to the H.264/AVC compatible layer, several spatial and/or SNR enhancement layers can be added to provide spatial and/or quality scalabilities. SNR scalability 406 is also referred as quality scalability. Each spatial 404 or SNR 406 enhancement layer itself may be temporally scalable, with the same temporal scalability structure as the H.264/AVC compatible layer. For one spatial or SNR enhancement layer, the lower layer the spatial or SNR enhancement layer depends on is also referred as the base layer of that specific spatial or SNR enhancement layer.

Figure 5:
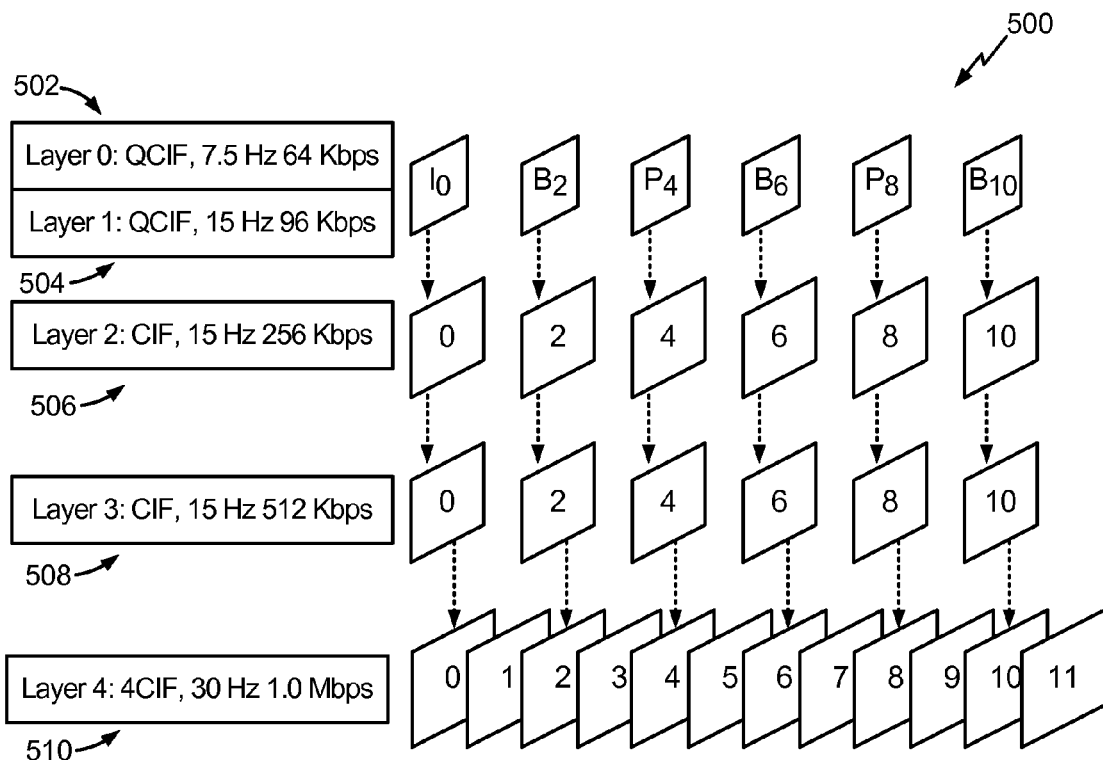
FIG. 5 is a block diagram illustrating an example structure of a scalable video coding (SVC) bitstream according to aspects of this disclosure.

An example of SVC coding structure 500 is shown in FIG. 5. The pictures with the lowest spatial and quality layer (pictures in layer 0 502 and layer 1 504, with QCIF resolution) are compatible with H.264/AVC. Among them, those pictures of the lowest temporal level form the temporal base layer, as shown in layer 0 502 of FIG. 5. This temporal base layer (layer 0) 502 can be enhanced with pictures of higher temporal levels (layer 1) 504. In addition to the H.264/AVC compatible layer 504, several spatial and/or SNR enhancement layers 506, 508, 510 can be added to provide spatial and/or quality scalabilities. For instance, the enhancement layer can be a CIF representation with the same resolution as layer 2 506. In the example, layer 3 508 is a SNR enhancement layer. As shown in the example, each spatial or SNR enhancement layer itself may be temporally scalable, with the same temporal scalability structure as the H.264/AVC compatible layer. Also, an enhancement layer can enhance both spatial resolution and frame rate. For example, layer 4 510 provides a 4CIF enhancement layer, which further increases the frame rate from 15 Hz to 30 Hz.

Figure 6:
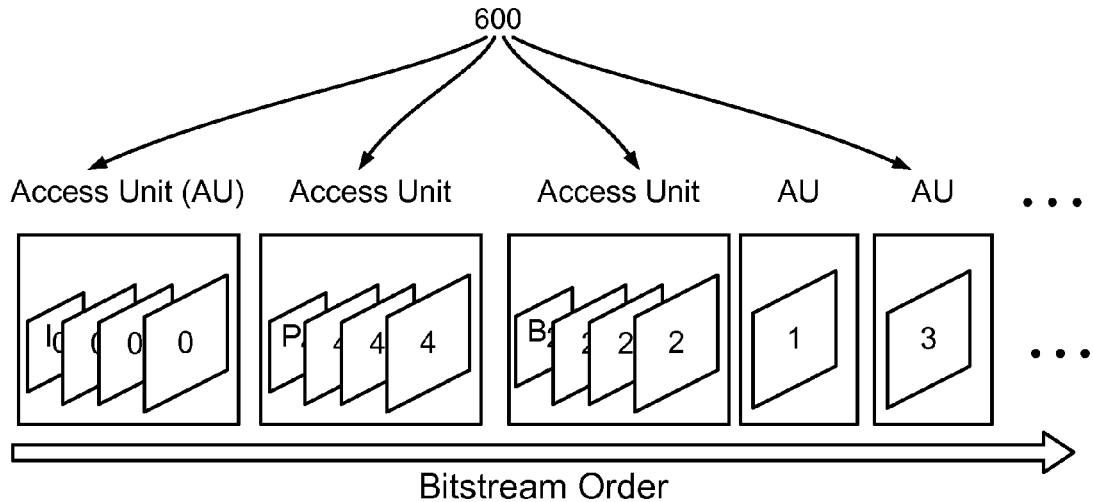
FIG. 6 is a block diagram illustrating example SVC access units in a bitstream according to aspects of this disclosure.

As shown in FIG. 6, the coded slices in the same time instance are successive in the bitstream order and form one access unit 600 in the context of SVC. Those SVC access units 600 then follow the decoding order, which could be different from the display order and decided e.g., by the temporal prediction relationship.

Generally, inter-layer texture prediction refers to the case wherein the reconstructed base layer pixel value is used to predict the pixel value in the enhancement layer. "Intra-BL mode" and "Inter-layer reference picture" are two approaches to inter-layer texture prediction.

The terms (coded) picture, access unit (AU), intra random access point (IRAP) AU, coded video sequence (CVS), and bitstream are broad terms having broad ordinary meanings. In some embodiments, these terms refer to the following. A coded picture is equivalent to a layer representation in SVC, a view component in MVC, and a texture or depth view component in MVC+D. As in SVC and MVC, an access unit (AU) consists of all the coded pictures associated with the same output time and their associated non-VCL NAL units. An IRAP Access Unit is an access unit in which all the coded pictures are IRAP pictures. A Coded Video Sequence (CVS) is sequence of access units that consists, in decoding order, of an IRAP access unit with NoRaslOutputFlag equal to 1, followed by zero or more access units that are not IRAP access units with NoRaslOutputFlag equal to 1, including all subsequent access units up to but not including any subsequent access unit that is an IRAP access unit with NoRaslOutputFlag equal to 1. A bitstream is a sequence of bits, in the form of a NAL unit stream or a byte stream, which forms the representation of one or more CVSs. The first AU in a bitstream is an IRAP AU.

Signalling and Derivation of Inter-Layer RPS

One method of inter-layer reference picture set (RPS) signaling and derivation is designed with the following purposes. The inter-layer RPS subset may be derived based on picture level syntax (e.g., the picture level syntax may be signaled in a slice header). The inter-layer RPS subset may be used to detect loss of pictures used for inter-layer picture reference. A sequence level indication can be used to reduce the picture level signaling overhead for typical user cases. For example, in SHVC, typically only one reference layer picture is used in inter layer prediction for coding a picture. Accordingly, the reference layer having the highest layer id is used for inter prediction, so inter-layer reference picture information is not explicitly signaled in any slice header.

In MV-HEVC and SHVC, syntax and semantics may be provided as follows.

Video Parameter Set Extension Syntax and Semantics in MV-HEVC and SHVC

TABLE 1

| | Descriptor |
|---|---|
| vps_extension( ) { | |
| ... | |
| max_one_active_ref_layer_flag | u(1) |
| } | |

In this example of Table 1, max_one_active_ref_layer_flag equal to 1 may specify or indicate that at most one picture is used for inter-layer prediction for each picture in the CVS. Also, max_one_active_ref_layer_flag equal to 0 may specify or indicate that more than one picture may be used for inter-layer prediction for each picture in the CVS.

General Slice Segment Header Syntax

In the example of Table 2, below, inter_layer_pred_enabled_flag equal to 1 may specify or indicate that inter-layer prediction may be used in decoding of the current picture. Also, inter_layer_pred_enabled_flag equal to 0 may specify or indicate that inter-layer prediction is not used in decoding of the current picture. When inter_layer_pred_enabled_flag is not present in the bitstream, or when the value of inter_layer_pred_enabled_flag is not signalled in the bitstream, the value of inter_layer_pred_enabled_flag can be inferred by a decoder to be equal to 0.

In the example of Table 2, num_inter_layer_ref_pics_minus1_plus 1 may specify or indicate the number of pictures that may be used in decoding of the current picture for inter-layer prediction. The length of the num_inter_layer_ref_pics_minus1 syntax element may be Ceil(Log 2(NumDirectRefLayers[nuh_layer_id]−1) bits. The value of num_inter_layer_ref_pics_minus1 can be in the range of 0 to NumDirectRefLayers[nuh_layer_id]−1, inclusive.

TABLE 2

| | Descriptor |
|---|---|
| slice_segment_header( ) { | |
| ... | |
| if( nuh_layer_id > 0 && NumDirectRefLayers[ nuh_layer_id ] > 0 ) { | |
|     inter_layer_pred_enabled_flag | u(1) |
|     if( inter_layer_pred_enabled_flag && NumDirectRefLayers[ nuh_layer_id ] > 1 ) { | |
|         if( !max_one_active_ref_layer_flag ) | |
|             num_inter_layer_ref_pics_minus1 | u(v) |
|         for( i = 0; i < NumActiveRefLayerPics; i++ ) | |
|             inter_layer_pred_layer_idc[ i ] | u(v) |
|     } | |
| } | |
| if( NumSamplePredRefLayers[ nuh_layer_id ] > 0 && NumActiveRefLayerPics > 0 ) | |
|     inter_layer_sample_pred_only_flag | u(1) |
| ... | |

The variable NumActiveRefLayerPics can be derived as shown in the following code:

```
if( nuh_layer_id = = 0 | | NumDirectRefLayers[ nuh_layer_id ] = = 0 | |
!inter_layer_pred_enabled_flag )
   NumActiveRefLayerPics = 0
else if( max_one_active_ref_layer_flag | | NumDirectRefLayers[
nuh_layer_id ] = = 1)
   NumActiveRefLayerPics = 1
else
   NumActiveRefLayerPics = num_inter_layer_ref_pics_minus1 + 1
```

All slices of a coded picture can have the same value of NumActiveRefLayerPics.

In the example of Table 2, inter_layer_pred_layer_idc[i] may specify or indicate the variable, RefPicLayerId[i], representing the nuh_layer_id of the i-th picture that may be used by the current picture for inter-layer prediction. The length of the syntax element inter_layer_pred_layer_idc[i] is Ceil(Log 2(NumDirectRefLayers[nuh_layer_id])) bits. The value of inter_layer_pred_layer_idc[i] can be in the range of 0 to NumDirectRefLayers[nuh_layer_id]−1, inclusive. When inter_layer_pred_layer_idc[i] is not present in the bitstream, or when the value of inter_layer_pred_layer_idc[i] is not signalled in the bitstream, the value of inter_layer_pred_layer_idc[i] can be inferred by a decoder to be equal to 0. When i is greater than 0, inter_layer_pred_layer_idc[i] can be greater than inter_layer_pred_layer_idc[i−1].

The variable RefPicLayerId[i] for each value of i in the range of 0 to NumActiveRefLayerPics−1, inclusive, can be derived as follows:

for (i=0; i<NumActiveRefLayerPics; i++)
RefPicLayerId[i]=RefLayerId[nuh_layer_id][inter_layer_pred_layer_idc[i]]

All slices of a picture can have the same value of inter_layer_pred_layer_idc[i] for each value of i in the range of 0 to NumActiveRefLayerPics−1, inclusive.

In some implementations, it is a requirement of bitstream conformance that for each value of i in the range of 0 to NumActiveRefLayerPics−1, inclusive, either of the following two conditions shall be true. The first condition is that the value of max_sublayer_for_ilp_plus1[LayerIdInVps [RefPicLayerId[i]]] is greater than TemporalId. The second condition is that the values of max_sublayer_for_ilp_plus1 [LayerIdInVps[RefPicLayerId[i]]] and TemporalId are both equal to 0, and the picture in the current access unit with nuh_layer_id equal to RefPicLayerId[i] is an IRAP picture.

In some implementations, it is a requirement of bitstream conformance that for each value of i in the range of 0 to NumActiveRefLayerPics−1, inclusive, the value of SamplePredEnabledFlag[nuh_layer_id] [RefPicLayerId[i]] or MotionPredEnabledFlag[nuh_layer_id] [RefPicLayerId[i]] is equal to 1.

In the example of Table 2, inter_layer_sample_pred_only_flag equal to 1 may specify or indicate that inter-prediction is not used in decoding of the current picture. Also, inter_layer_sample_pred_only_flag equal to 0 may specify or indicate that inter-prediction may be used in decoding of the current picture. When inter_layer_sample_pred_only_flag is not present in the bitstream, or when the value of inter_layer_sample_pred_only_flag is not signalled in the bitstream, the value of inter_layer_sample_pred_only_flag can be inferred by a decoder to be equal to 0.

The variable InterRefEnabledInRPLFlag can be derived as follows. If NumSamplePredRefLayers[nuh_layer_id] is greater than 0 and NumActiveRefLayerPics is greater than 0, InterRefEnabledInRPLFlag can be set equal to the !inter_layer_sample_pred_only_flag. If not, InterRefEnabledInRPLFlag can be set equal to 1.

The syntax and semantics for inter-layer prediction (ILP) in MV-HEVC and SHVC has certain problems and shortcomings. For example, signaling of inter-layer prediction in the slice header is always needed for non-base layer pictures as long as NumDirectRefLayers[nuh_layer_id] is greater than 0. However, for various typical scenarios, it is not needed to change the inter-layer prediction slice by slice. Consequently, it is not needed to signal any inter-layer prediction in the slice header. Therefore, bits utilized to signal inter-layer prediction in the slice header become unnecessary in these situations. Such scenarios include, in typical multiview video coding scenarios, when the direct reference layer pictures in the inter-layer RPS, as specified within at least one of a video parameter set (VPS), a sequence parameter set (SPS), or a picture parameter set (PPS), are all used for inter-layer prediction and all are inserted into at least one reference picture list of the current picture. Such scenarios in which bits utilized to signal inter-layer prediction in the slice header are unnecessary may also or alternatively include scenarios in which the value of NumDirectRefLayers[nuh_layer_id] is equal to the value of NumActiveRefLayerPics. When the NumDirectRefLayers[nuh_layer_id] is equal to NumActiveRefLayerPics, there is no need to signal inter layer_pred_layer_idc[i].

In some embodiments, the following techniques provide mechanisms to address the problems and shortcomings described above and to avoid unnecessary signaling in the slice header. These techniques result in improved coding efficiency and reduced computing resource requirements.

In some embodiments, the techniques include receiving one or more layers of video information, each layer comprising at least one picture. The techniques may include processing an indicator within at least one of a video parameter set (VPS), a sequence parameter set (SPS), or a picture parameter set (PPS) that indicates whether all direct reference layer pictures associated with the at least one of the video parameter set (VPS), the sequence parameter set (SPS), or the picture parameter set (PPS) are added to an inter-layer reference picture set. The techniques may include, based on the indicator (e.g., if the indicator indicates that all associated direct reference layer pictures are added to the inter-layer reference picture set), refraining from further signaling inter-layer reference picture information in any video slice associated with the at least one of the video parameter set (VPS), the sequence parameter set (SPS), or the picture parameter set (PPS). For example, the techniques include providing and/or processing an indication in the video parameter set (VPS) of whether all the direct reference layer pictures are added to the inter-layer reference picture set (RPS), such that all video slices referring to (e.g., associated with) the VPS having such an indication are added to the inter-layer reference picture set for any slice referring to or associated with the VPS. For example, the video slices referring to or associated with the VPS do not include any further syntax elements for inter-layer signaling in a slice header of any video slice. Alternatively, the indication indicating whether all the direct reference layer pictures are added to the inter-layer RPS in the video parameter set can be present in the SPS or in the PPS. Accordingly, the constraint that all the direct reference layer pictures are added to the inter-layer RPS for any and all slices referring to (e.g., associated with) the SPS or the PPS similarly applies. In addition, the constraint that all the direct reference layer pictures are added to the inter-layer RPS can be introduced for MV-HEVC, such that the constraint may always apply. In this case, signalling the constraint that all the direct reference layer pictures are added to the inter-layer RPS may be mandatory.

In some embodiments, the techniques include receiving one or more layers of video information, each layer comprising at least one picture. The techniques may further include determining a number of direct reference layers associated with one of the one or more layers. The techniques may further include refraining from signaling inter-layer prediction when the number of direct reference layers equals a number of active reference layer pictures associated with the video information. For example, when NumDirectRefLayers[nuh_layer_id] is equal to NumActiveRefLayerPics, inter_layer_pred_layer_idc[i] is not signalled.

Some embodiments include modifications (such as additions and deletions) to certain syntax and semantics elements provided in various HEVC standards and drafts. For example, additions and deletions to the MV-HEVC WD4 and SHVC WD2 are described below. In addition, some parts that are not mentioned or otherwise indicated as added or removed are or can be the same as in MV-HEVC WD3 and SHVC WD1.

Video Parameter Set Extension Syntax and Semantics (First Set of Embodiments)

In some of a first set of embodiments, the syntax can correspond to that shown below in Table 3.

TABLE 3

| | Descriptor |
|---|---|
| vps_extension( ) { | |
| ... | |
|     all_dep_layer_used_flag | u(1) |
|     if( !all_dep_layer_used_flag ) { | |
|         max_one_active_ref_layer_flag | u(1) |
|         if( max_one_active_ref_layer_flag ) | |
|             highest_dep_layer_used_flag | u(1) |
| } | |

In the example of Table 3, all_dep_layer_used_flag equal to 1 can specify or indicate that all the direct reference layer pictures (resampled when necessary) of the current picture, which may be specified by VPS syntax, are added to inter-layer reference picture set for each picture referring to the VPS. For example, in some embodiments, a method of coding video information includes receiving one or more layers of video information, each layer comprising at least one picture; processing an indicator, such as all_dep_layer_used_flag, within at least one of a video parameter set (VPS), a sequence parameter set (SPS), or a picture parameter set (PPS) that indicates whether all direct reference layer pictures associated with the at least one video parameter set (VPS), sequence parameter set (SPS), or picture parameter set (PPS) are added to an inter-layer reference picture set; and, based on the indicator (e.g., if all_dep_layer_used_flag is equal to 1), refraining from further signaling inter-layer reference picture information in any video slice associated with the at least one of the video parameter set (VPS), the sequence parameter set (SPS), or the picture parameter set (PPS).

In addition, the all_dep_layer_used_flag equal to 0 can specify or indicate that all the direct reference layer pictures (resampled when necessary) of the current picture, which is specified by VPS syntax, may or may not be added to inter-layer reference picture set for a picture referring to the VPS. For example, in some embodiments, a method of coding video information includes processing an indicator, such as the all_dep_layer_used_flag, within at least one of a video parameter set (VPS), a sequence parameter set (SPS), or a picture parameter set (PPS) that indicates whether all direct reference layer pictures associated with the at least one of the video parameter set (VPS), the sequence parameter set (SPS), or the picture parameter set (PPS) are added to an inter-layer reference picture set; and, if the indicator does not indicate that all direct reference layer pictures associated with the at least one of the video parameter set (VPS), the sequence parameter set (SPS), or the picture parameter set (PPS) are added to an inter-layer reference picture set (e.g., if all_dep_layer_used_flag is equal to 0), not refraining from further signaling inter-layer reference picture information in any video slice associated with the at least one video parameter set (VPS), sequence parameter set (SPS), or picture parameter set (PPS). In other words, if the all_dep_layer_used_flag has a value of 0, inter-layer reference picture information may be signaled in any video slice associated with the at least one of the VPS, the SPS, or the PPS. For example, if all_dep_layer_used_flag is equal to 0, all the direct reference layer pictures of the current picture may or may not be added to inter-layer reference picture set for a picture referring to the VPS.

In the example of Tables 3 and 4, max_one_active_ref_layer_flag equal to 1 can specify or indicate that at most one picture is used for inter-layer prediction for each picture in the CVS. Also, max_one_active_ref_layer_flag equal to 0 can specify or indicate that more than one picture may be used for inter-layer prediction for each picture in the CVS.

In the example of Tables 3 and 4, highest_dep_layer_used_flag equal to 1 can specify or indicate that only the dependent layer with the highest value of nuh_layer_id is used for inter-layer prediction for each picture that uses inter-layer prediction. Also, highest_dep_layer_used_flag equal to 0 can specify or indicate any dependent layer may or may not be used for inter-layer prediction for each picture. When highest_dep_layer_used_flag is not present in the bitstream, or when the value of highest_dep_layer_used_flag is not signalled in the bitstream, the value of highest_dep_layer_used_flag can be inferred by a decoder to be equal to 0.

In others of the first set of embodiments, the syntax can correspond to that shown below in Table 4.

TABLE 4

| | Descriptor |
|---|---|
| vps_extension( ) { | |
| ... | |
|     selective_dep_layer_flag | u(1) |
|     if( selective_dep_layer_flag ) { | |
|         max_one_active_ref_layer_flag | u(1) |
|         if( max_one_active_ref_layer_flag ) | |
|             highest_dep_layer_used_flag | u(1) |
| } | |

In yet others of the first set of embodiments, the syntax can correspond to that shown below in Table 5.

TABLE 5

| | Descriptor |
|---|---|
| Vps_extension( ) { | |
| ... | |
|     selective_dep_layer_idc | u(2) |
| } | |

In the example of Table 5, selective_dep_layer_idc can take values as indicated in Table 6.

TABLE 6

| | |
|---|---|
| 0 | All direct reference layers are included in the inter-layer RPS (no slice header signaling) |
| 1 | Only the direct reference layer with the highest value of nuh_layer_id is included in the inter-layer RPS (no slice header signaling) |
| 2 | Selective and thus require slice header signaling. |
| 3 | Reserved |

General Slice Segment Header Syntax and Semantics (Second Set of Embodiments)

In some of a second set of embodiments, the syntax can correspond to that shown below in Table 7.

In the examples of Table 7 and 8, inter_layer_pred_enabled_flag equal to 1 can specify or indicate that inter-layer prediction may be used in decoding of the current picture. Also, inter_layer_pred_enabled_flag equal to 0 can specify or indicate that inter-layer prediction is not used in decoding of the current picture. When inter_layer_pred_enabled_flag is not present in the bitstream, or when the value of inter_layer_pred_enabled_flag is not signalled in the bitstream, the value of inter_layer_pred_enabled_flag can be inferred by a decoder to be equal to the value of all_dep_layer_used_flag.

TABLE 7

| | Descriptor |
|---|---|
| slice_segment_header( ) { <br>    ... <br>    if( nuh_layer_id > 0 && NumDirectRefLayers[ nuh_layer_id ] > 0 <br>                 && !all_dep_layer_used_flag) { <br>       inter_layer_pred_enabled_flag <br>       if( inter_layer_pred_enabled_flag && <br> NumDirectRefLayers[ nuh_layer_id ] > 1 <br>               && !highest_dep_layer_used_flag ) { <br>         if( !max_one_active_ref_layer_flag ) <br>           num_inter_layer_ref_pics_minus1 <br>         for( i = 0; i < NumActiveRefLayerPics; i++ ) <br>           inter_layer_pred_layer_idc[ i ] <br>       } <br>    } <br>    if( NumSamplePredRefLayers[ nuh_layer_id ] > 0 && <br> NumActiveRefLayerPics > 0 ) <br>       inter_layer_sample_pred_only_flag <br>    ... | <br><br><br><br>u(1)<br><br><br><br><br><br>u(v)<br><br>u(v)<br><br><br><br><br><br>u(1) |

In the example of Tables 7 and 8, num_inter_layer_ref_pics_minus1 plus 1 can specify or indicate the number of pictures that may be used in decoding of the current picture for inter-layer prediction. The length of the num_inter_layer_ref_pics_minus1 syntax element can be Ceil(Log 2(NumDirectRefLayers[nuh_layer_id]−1) bits. The value of num_inter_layer_ref_pics_minus1 can be in the range of 0 to NumDirectRefLayers[nuh_layer_id]−1, inclusive.

In the examples of Tables 7 and 8, the variable NumActiveRefLayerPics can be derived as follows:

```
if( nuh_layer_id = = 0 | | NumDirectRefLayers[ nuh_layer_id ] = = 0 | |
!inter_layer_pred_enabled_flag )
    NumActiveRefLayerPics = 0
else if( all_dep_layer_used_flag )
    NumActiveRefLayerPics = NumDirectRefLayers[ nuh_layer_id ]
else if( max_one_active_ref_layer_flag | | NumDirectRefLayers[
nuh_layer_id ] = = 1)
    NumActiveRefLayerPics = 1
else
    NumActiveRefLayerPics = num_inter_layer_ref_pics_minus1 + 1
```

All slices of a coded picture can have the same value of NumActiveRefLayerPics.

In the examples of Tables 7 and 8, inter_layer_pred_layer_idc[i] can specify or indicate the variable, RefPicLayerId[i], representing the nuh_layer_id of the i-th picture that may be used by the current picture for inter-layer prediction. The length of the syntax element inter_layer_pred_layer_idc[i] can be Ceil(Log 2(NumDirectRefLayers[nuh_layer_id])) bits. The value of inter_layer_pred_layer_idc[i] can be in the range of 0 to NumDirectRefLayers[nuh_layer_id]−1, inclusive.

When inter_layer_pred_layer_idc[i] is not present in the bitstream, or when the value of inter_layer_pred_layer_idc[i] is not signalled in the bitstream, the value of inter_layer_pred_layer_idc[i] can be inferred by a decoder as follows:

```
for( i = 0; i < NumActiveRefLayerPics; i++) {
    if( all_dep_layer_used_flag )
        inter_layer_pred_layer_idc[ i ] = NumActiveRefLayerPics − i − 1
    else if( highest_dep_layer_used_flag )
        inter_layer_pred_layer_idc[ i ] =
NumDirectRefLayers[ nuh_layer_id ] − 1
    else
        inter_layer_pred_layer_idc[ i ] = 0
}
```

When i is greater than 0, inter_layer_pred_layer_idc[i] can be greater than inter_layer_pred_layer_idc[i−1].

The variable RefPicLayerId[i] for each value of i in the range of 0 to NumActiveRefLayerPics−1, inclusive, can be derived as follows:

```
for( i = 0; i < NumActiveRefLayerPics; i++)
    RefPicLayerId[ i ] =
    RefLayerId[ nuh_layer_id ][ inter_layer_pred_layer_idc[ i ] ]
```

All slices of a picture can have the same value of inter_layer_pred_layer_idc[i] for each value of i in the range of 0 to NumActiveRefLayerPics−1, inclusive.

In others of the second set of embodiments, the syntax can correspond to that shown below in Table 8.

TABLE 8

| | Descriptor |
|---|---|
| Slice_segment_header( ) { <br>    ... <br>    if( nuh_layer_id > 0 && NumDirectRefLayers[ nuh_layer_id ] > 0 <br>               && selective_dep_layer_flag ) { <br>       inter_layer_pred_enabled_flag <br>       if( inter_layer_pred_enabled_flag && <br> NumDirectRefLayers[ nuh_layer_id ] > 1 <br>               && !highest_dep_layer_used_flag ) { <br>         if( !max_one_active_ref_layer_flag ) | <br><br><br><br>u(1) |

TABLE 8-continued

| | Descriptor |
|---|---|
|         num_inter_layer_ref_pics_minus1 | u(v) |
|         for( I = 0; I < NumActiveRefLayerPics; i++ ) | |
|             inter_layer_pred_layer_idc[ I ] | u(v) |
|         } | |
|     } | |
|     if( NumSamplePredRefLayers[ nuh_layer_id ] > 0 && NumActiveRefLayerPics > 0 ) | |
|         inter_layer_sample_pred_only_flag | u(1) |
| ... | |

In some embodiments, it can be a requirement of bitstream conformance that for each value of i in the range of 0 to NumActiveRefLayerPics−1, inclusive, either of the following two conditions are true. The first condition is that the value of max_sublayer_for_ilp_plus1[LayerIdInVps [RefPicLayerId[i]]] is greater than TemporalId. The second condition is that the values of max_sublayer_for_ilp_plus1 [LayerIdInVps[RefPicLayerId[i]]] and TemporalId are both equal to 0, and the picture in the current access unit with nuh_layer_id equal to RefPicLayerId[i] is an IRAP picture.

In some embodiments, it can be a requirement of bitstream conformance that for each value of i in the range of 0 to NumActiveRefLayerPics−1, inclusive, the value of SamplePredEnabledFlag[nuh_layer_id] [RefPicLayerId[i]] or MotionPredEnabledFlag[nuh_layer_id] [RefPicLayerId [i]] shall be equal to 1.

In others of a second set of embodiments, the syntax can correspond to that shown below in Table 9.

General Slice Segment Header Syntax and Semantics (Third Set of Embodiments)

In a third set of embodiments, a condition can be added for signaling the reference layer picture (RLP) index in a slice header to avoid sending the information in the case that the active number of reference layer picture is the same to the total number of reference layer picture. For example, in some embodiments, a method of coding video information can include receiving one or more layers of video information, each layer comprising at least one picture; determining a number of direct reference layers associated with one of the one or more layers; and refraining from signaling inter-layer reference picture information when the number of direct reference layers equals a number of active reference layer pictures associated with the video information. The method may further include coding said video information based at least in part on said determining.

TABLE 9

| | Descriptor |
|---|---|
| slice_segment_header( ) { | |
|   ... | |
|   if( nuh_layer_id > 0 && NumDirectRefLayers[ nuh_layer_id ] > 0) { | |
|     inter_layer_pred_enabled_flag | u(1) |
|     if( inter_layer_pred_enabled_flag && NumDirectRefLayers[ nuh_layer_id ] > 1 | |
|         && !highest_dep_layer_used_flag && !all_dep_layer_used_flag ) { | |
|       if( !max_one_active_ref_layer_flag ) | |
|         num_inter_layer_ref_pics_minus1 | u(v) |
|       for( i = 0; i < NumActiveRefLayerPics; i++ ) | |
|         inter_layer_pred_layer_idc[ i ] | u(v) |
|     } | |
|   } | |
|   if( NumSamplePredRefLayers[ nuh_layer_id ] > 0 && NumActiveRefLayerPics > 0 ) | |
|     inter_layer_sample_pred_only_flag | u(1) |
| ... | |

In some of the third set of embodiments, the syntax can correspond to that shown below in Table 10.

TABLE 10

| | Descriptor |
|---|---|
| Slice_segment_header( ) { | |
|   ... | |
|   if( nuh_layer_id > 0 && NumDirectRefLayers[ nuh_layer_id ] > 0) { | |
|     inter_layer_pred_enabled_flag | u(1) |
|     if( inter_layer_pred_enabled_flag && | |

TABLE 10-continued

| | Descriptor |
|---|---|
| NumDirectRefLayers[ nuh_layer_id ] > 1) { | |
|     if( !max_one_active_ref_layer_flag ) | |
|         num_inter_layer_ref_pics_minus1 | u(v) |
|     if( NumDirectRefLayers[ nuh_layer_id] != NumActiveRefLayerPics) { | |
|         for( I = 0; I < NumActiveRefLayerPics; i++ ) | |
|             inter_layer_pred_layer_idc[ I ] | u(v) |
|     } | |
|   } | |
| } | |
| if( NumSamplePredRefLayers[ nuh_layer_id ] > 0 && NumActiveRefLayerPics > 0 ) | |
|     inter_layer_sample_pred_only_flag | u(1) |
| ... | |

In the example of Table 10, inter_layer_pred_layer_idc[i] can specify or indicate the variable, RefPicLayerId[i], representing the nuh_layer_id of the i-th picture that may be used by the current picture for inter-layer prediction. The length of the syntax element inter_layer_pred_layer_idc[i] can be Ceil(Log 2(NumDirectRefLayers[nuh_layer_id])) bits. The value of inter_layer_pred_layer_idc[i] can be in the range of 0 to NumDirectRefLayers[nuh_layer_id]−1, inclusive.

When inter_layer_pred_layer_idc[i] is not present in the bitstream, or when the value of inter_layer_pred_layer_idc [i] is not signalled in the bitstream, the value of inter_layer_pred_idc[i] can be inferred by a decoder as follows:

```
for( i = 0; i < NumActiveRefLayerPics; i++){
  if( NumDirectRefLayers[ nuh_layer_id ] = = NumActiveRefLayerPics )
    inter_layer_pred_layer_idc[ i ] = NumActiveRefLayerPics − i − 1
  else
    inter_layer_pred_layer_idc[ i ] = 0
}
```

General Slice Segment Header Syntax and Semantics (Fourth Set of Embodiments)

In some of a fourth set of embodiments, a syntax highest_ref_layer_active_flag can be signaled to indicate whether the picture from the reference layer with the highest value of nuh_layer_id is always included in the inter-layer reference picture set. For example, when highest_ref_layer_active_flag is equal to 1 and the interlayer reference picture set is not empty, the picture from the reference layer with the highest value of nuh_layer_id can always present as the first entry in the inter-layer reference picture set.

In these embodiments, even when the picture with the highest value of nuh_layer_id is included in the inter-layer reference picture set (e.g., as indicated by highest_ref_layer_active_flag), pictures from other reference layers can still be added into the inter-layer reference picture set.

In some of the fourth set of embodiments, the syntax can correspond to that shown below in Table 11.

TABLE 11

| | Descriptor |
|---|---|
| vps_extension( ) { | |
|   ... | |
|   max_one_active_ref_layer_flag | u(1) |
|   all_ref_layers_active_flag | u(1) |
|   if( !all_ref_layers_active_flag ) | |
|     highest_ref_layer_active_flag | u(1) |
|   ... | |
| } | |

In the example of Tables 11 and 12, all_ref_layers_active_flag equal to 1 can specify or indicate that, for each picture referring to the VPS, pictures of all direct reference layers specified by the VPS are present in the same access unit and are included in the inter-layer reference picture set. Also, all_dep_layer_used_flag equal to 0 can specify or indicate that the above restriction may or may not apply.

In the example of Tables 11 and 12, highest_ref_layer_active_flag equal to 1 can specify or indicate that the direct reference layer picture with the highest value of nuh_layer_id of a current picture referring to the VPS is included in the inter-layer reference picture set. Also, highest_ref_layer_active_flag equal to 0 can specify or indicate that the above restriction may or may not apply. When highest_ref_layer_active_flag is not present in the bitstream, or when the value of highest_ref_layer_active_flag is not signalled in the bitstream, the value of highest_ref_layer_active_flag can be inferred by a decoder to be 0.

In some of the fourth set of embodiments, the syntax can correspond to that shown below in Table 12.

In the example of Table 12, num_inter_layer_ref_pics_minus1_plus 1 can specify or indicate the number of pictures that may be used in decoding of the current picture for inter-layer prediction. The length of the num_inter_layer_ref_pics_minus1 syntax element can be Ceil(Log 2(NumDirectRefLayers[nuh_layer_id]−1) bits. The value of num_inter_layer_ref_pics_minus1 can be in the range of 0 to NumDirectRefLayers[nuh_layer_id]−1, inclusive.

TABLE 12

| | Descriptor |
|---|---|
| slice_segment_header( ) { | |
|    ... | |
|    if( nuh_layer_id > 0 && NumDirectRefLayers[ nuh_layer_id ] > 0 | |
|               && !all_ref_layers_active_flag ) { | |
|       inter_layer_pred_enabled_flag | u(1) |
|       if( inter_layer_pred_enabled_flag && NumDirectRefLayers[ nuh_layer_id ] > 1) { | |
|          if( !max_one_active_ref_layer_flag ) | |
|             num_inter_layer_ref_pics_minus1 | u(v) |
|          if( NumActiveRefLayerPics != NumDirectRefLayers[ nuh_layer_id ] ) | |
|             for( i = highest_ref_layer_active_flag; i < NumActiveRefLayerPics; i++ ) | |
|                inter_layer_pred_layer_idc[ i ] | u(v) |
|       } | |
|    } | |
|    if( NumSamplePredRefLayers[ nuh_layer_id ] > 0 && NumActiveRefLayerPics > 0 ) | |
|       inter_layer_sample_pred_only_flag | u(1) |
|    ... | |

The variable NumActiveRefLayerPics can be derived as follows:

```
if( nuh_layer_id = = 0 | | NumDirectRefLayers[ nuh_layer_id ] = = 0 )
    NumActiveRefLayerPics = 0
else if( all_ref_layers_active_flag )
    NumActiveRefLayerPics = NumDirectRefLayers[ nuh_layer_id ]
else if( !inter_layer_pred_enabled_flag )
    NumActiveRefLayerPics = 0
else if( max_one_active_ref_layer_flag | | NumDirectRefLayers[ nuh_layer_id ] = = 1)
    NumActiveRefLayerPics = 1
else
    NumActiveRefLayerPics = num_inter_layer_ref_pics_minus1 + 1
```

All slices of a coded picture can have the same value of NumActiveRefLayerPics.

In the example of Table 12, inter_layer_pred_layer_idc[i] can specify or indicate the variable, RefPicLayerId[i], representing the nuh_layer_id of the i-th picture that may be used by the current picture for inter-layer prediction. The length of the syntax element inter_layer_pred_layer_idc[i] can be Ceil(Log 2(NumDirectRefLayers[nuh_layer_id])) bits. The value of inter_layer_pred_layer_idc[i] can be in the range of 0 to NumDirectRefLayers[nuh_layer_id]−1, inclusive.

When NumActiveRefLayerPics is greater than 0, the following can apply for inferrence of the value of inter_layer_pred_layer_idc[i]:

```
if( NumActiveRefLayerPics = = NumDirectRefLayers[ nuh_layer_id ] )
    for( i = highest_ref_layer_active_flag; i < NumActiveRefLayerPics; i++)
        inter_layer_pred_layer_idc[ i ] = NumActiveRefLayerPics − i − 1
if( highest_ref_layer_active_flag )
    inter_layer_pred_layer idc[ 0 ] = NumDirectRefLayers[ nuh_layer_id ] − 1
```

When i is greater than 0, inter_layer_pred_layer_idc[i] can be less than inter_layer_pred_layer_idc[i−1].

The variables RefPicLayerId[i] for each value of i in the range of 0 to NumActiveRefLayerPics−1, inclusive, NumActiveMotionPredRefLayers, and ActiveMotionPredRefLayerId[j] for each value of j in the range of 0 to NumActiveMotionPredRefLayers−1, inclusive, can be derived as follows:

```
for( i = 0, j = 0; i < NumActiveRefLayerPics; i++)
    RefPicLayerId[ i ] =
RefLayerId[ nuh_layer_id ][ inter_layer_pred_layer_idc[ i ] ]
    if( MotionPredEnabledFlag[ nuh_layer_id ][
inter_layer_pred_layer_idc[ i ] ] )
        ActiveMotionPredRefLayerId[ j++ ] =
RefLayerId[ nuh_layer_id ][ inter_layer_pred_layer_idc[ i ] ]
}
NumActiveMotionPredRefLayers = j
```

All slices of a picture can have the same value of inter_layer_pred_layer_idc[i] for each value of i in the range of 0 to NumActiveRefLayerPics−1, inclusive.

In some embodiments, it can be a requirement of bitstream conformance that for each value of i in the range of 0 to NumActiveRefLayerPics−1, inclusive, either of the following two conditions are true. The first condition is that the value of max_tid_il_ref_pics_plus1 [LayerIdxInVps [RefPicLayerId[i]]] is greater than TemporalId. The second condition is that the values of max_tid_il_ref_pics_plus1 [LayerIdxInVps[RefPicLayerId[i]]] and TemporalId are both equal to 0 and the picture in the current access unit with nuh_layer_id equal to RefPicLayerId[i] is an IRAP picture.

In some embodiments, it can be a requirement of bitstream conformance that for each value of i in the range of 0 to NumActiveRefLayerPics−1, inclusive, the value of SamplePredEnabledFlag[nuh_layer_id] [RefPicLayerId[i]] or MotionPredEnabledFlag[nuh_layer_id] [RefPicLayerId [i]] is equal to 1.

General Slice Segment Header Syntax and Semantics (Fifth Set of Embodiments)

In a fifth set of embodiments, the VPS syntax design can be the same to that of the fourth set of embodiments discussed above. However, in the fifth set of embodiments, the order of the value of inter layer_pred_layer_idc[i] may be different. For example, in the fifth set of embodiments, when highest_ref_layer_active_flag is equal to 1, this picture may always be present as the last entry in the inter-layer reference picture set. Similarly to the fourth set of embodiments, even when the picture with the highest value of nuh_layer_id is included in the inter-layer reference picture set (e.g., as indicated by highest_ref_layer_active_flag), pictures from other reference layers can still be added into the inter-layer reference picture set.

In some of the fifth set of embodiments, the syntax can correspond to that shown below in Table 13.

TABLE 13

| | Descriptor |
|---|---|
| slice_segment_header( ) {<br>   ...<br>   if( nuh_layer_id > 0 && NumDirectRefLayers[ nuh_layer_id ] > 0<br>                  && !all_ref_layers_active_flag ) {<br>     inter_layer_pred_enabled_flag<br>     if( inter_layer_pred_enabled_flag &&<br>NumDirectRefLayers[ nuh_layer_id ] > 1) {<br>        if( !max_one_active_ref_layer_flag )<br>          num_inter_layer_ref_pics_minus1<br>        if( NumActiveRefLayerPics != NumDirectRefLayers[ nuh_layer_id ] )<br>         _for( i =0; i <<br>NumActiveRefLayerPics − highest_ref_layer_active_flag; i++ )<br>          _ inter_layer_pred_layer_idc[ i ]<br>     }<br>   }<br>   if( NumSamplePredRefLayers[ nuh_layer_id ] > 0 &&<br>NumActiveRefLayerPics > 0 )<br>     inter_layer_sample_pred_only_flag<br>   ... | <br><br><br><br>u(1)<br><br><br><br>u(v)<br><br><br><br>u(v)<br><br><br><br><br>u(1) |

In the example of Table 13, num_inter_layer_ref_pics_minus1_plus 1 can specify or indicate the number of pictures that may be used in decoding of the current picture for inter-layer prediction. The length of the num_inter_layer_ref_pics_minus1 syntax element can be Ceil(Log 2(NumDirectRefLayers[nuh_layer_id]−1) bits. The value of num_inter_layer_ref_pics_minus1 can be in the range of 0 to NumDirectRefLayers[nuh_layer_id]−1, inclusive.

The variable NumActiveRefLayerPics can be derived as follows:

```
if( nuh_layer_id = = 0 | | NumDirectRefLayers[ nuh_layer_id ] = = 0 )
    NumActiveRefLayerPics = 0
else if( all_ref_layers_active_flag )
    NumActiveRefLayerPics = NumDirectRefLayers[ nuh_layer_id ]
else if( !inter_layer_pred_enabled_flag )
    NumActiveRefLayerPics = 0
else if( max_one_active_ref_layer_flag | | NumDirectRefLayers[
nuh_layer_id ] = = 1)
    NumActiveRefLayerPics = 1
else
    NumActiveRefLayerPics = num_inter_layer_ref_pics_minus1 + 1
```

All slices of a coded picture can have the same value of NumActiveRefLayerPics.

In the example of Table 13, inter_layer_pred_layer_idc[i] can specify or indicate the variable, RefPicLayerId[i], representing the nuh_layer_id of the i-th picture that may be used by the current picture for inter-layer prediction. The length of the syntax element inter_layer_pred_layer_idc[i] can be Ceil(Log 2(NumDirectRefLayers[nuh_layer_id])) bits. The value of inter_layer_pred_layer_idc[i] can be in the range of 0 to NumDirectRefLayers[nuh_layer_id]−1, inclusive.

When NumActiveRefLayerPics is greater than 0, the following can apply for inferrence of the value of inter_layer_pred_layer_idc[i]:

```
if( NumActiveRefLayerPics = = NumDirectRefLayers[ nuh_layer_id ] )
    for( i = 0; i < NumActiveRefLayerPics − highest_ref_layer_ active_flag;
i++)
        inter_layer_pred_layer_idc[ i ] = i
if( highest_ref_layer_active_ flag )
```

-continued

```
inter_layer_pred_layer_idc[ NumActiveRefLayerPics − 1 ] =
NumDirectRefLayers[ nuh_layer_id ] − 1
```

When i is greater than 0, inter_layer_pred_layer_idc[i] can be greater than inter_layer_pred_layer_idc[i−1].

The variables RefPicLayerId[i] for each value of i in the range of 0 to NumActiveRefLayerPics−1, inclusive, NumActiveMotionPredRefLayers, and ActiveMotionPredRefLayerId[j] for each value of j in the range of 0 to NumActiveMotionPredRefLayers−1, inclusive, can be derived as follows:

```
for( i = 0, j = 0; i < NumActiveRefLayerPics; i++)
    RefPicLayerId[ i ] =
RefLayerId[ nuh_layer_id ][ inter_layer_pred_layer_idc[ i ] ]
    if( MotionPredEnabledFlag[ nuh_layer_id ][ inter_layer_pred_layer_idc
        [ i ] ] )
        ActiveMotionPredRefLayerId[ j++ ] =
RefLayerId[ nuh_layer_id ][ inter_layer_pred_layer_idc[ i ] ]
}
NumActiveMotionPredRefLayers = j
```

All slices of a picture can have the same value of inter_layer_pred_layer_idc[i] for each value of i in the range of 0 to NumActiveRefLayerPics−1, inclusive.

In some embodiments, it can be a requirement of bitstream conformance that for each value of i in the range of 0 to NumActiveRefLayerPics−1, inclusive, either of the following two conditions can be true. The first condition is that the value of max_tid_il_ref_pics_plus1 [LayerIdxInVps [RefPicLayerId[i]]] is greater than TemporalId. The second condition is that the values of max_tid_il_ref_pics_plus1 [LayerIdxInVps[RefPicLayerId[i]]] and TemporalId are both equal to 0, and the picture in the current access unit with nuh_layer_id equal to RefPicLayerId[i] is an IRAP picture.

In some embodiments, it can be a requirement of bitstream conformance that for each value of i in the range of 0 to NumActiveRefLayerPics−1, inclusive, the value of SamplePredEnabledFlag[nuh_layer_id] [RefPicLayerId[i]] or MotionPredEnabledFlag[nuh_layer_id] [RefPicLayerId [i]] is equal to 1.

Figure 7:
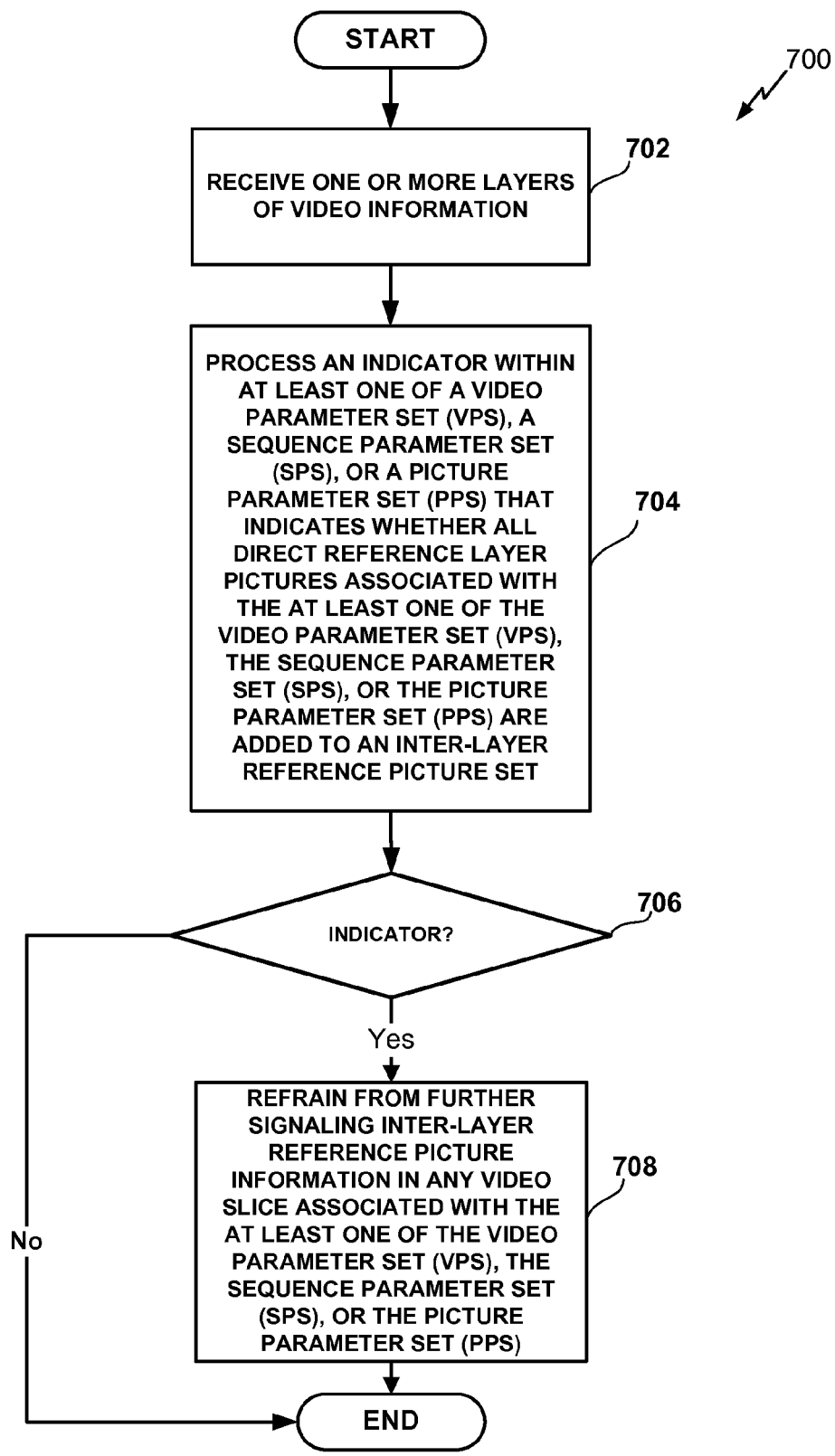
FIG. 7 illustrates an example method for encoding video data according to an embodiment.

FIG. 7 illustrates an example method 700 for encoding video data according to an example embodiment. The method 700 can be performed by one or more components of video encoder 20, for example. In some embodiments, other components may be used to implement one or more of the steps described herein.

At block 702, one or more layers of video information can be received. Each layer can include at least one picture.

At block 704, an indicator can be processed within at least one of a video parameter set (VPS), a sequence parameter set (SPS), or a picture parameter set (PPS) that indicates whether all direct reference layer pictures associated with the at least one of the video parameter set (VPS), the sequence parameter set (SPS), or the picture parameter set (PPS) are added to an inter-layer reference picture set. For example, an indication of whether all the direct reference layer pictures are added to the inter-layer reference picture set (RPS) in the video parameter set (VPS) can be introduced into the VPS, such that any slice referring to a VPS with such an indication specifying or indicating all dependent layer pictures are added does not contain any further syntax element for inter-layer signalling in the slice header. Alternatively, the indication can be present in the SPS and/or the PPS. Accordingly, the constraint that all the direct reference layer pictures are added to the inter-layer RPS for any and all slices referring to (e.g., associated with) the SPS or the PPS similarly applies. In addition, the constraint that all the direct reference layer pictures are added to the inter-layer RPS can be introduced for MV-HEVC, such that the constraint may always apply. In some embodiments, an indicator such as all_dep_layer_used_flag can be processed to specify or indicate whether all the direct reference layer pictures of the current picture, which may be specified by VPS syntax, are added to inter-layer reference picture set for each picture referring to the VPS.

At block 706, the value of the indicator may be evaluated. Based on the indicator (e.g., if the indicator does not indicate that all associated direct reference layer pictures are added to the inter-layer reference picture set), the method 700 may end. For example, if an indicator such as all_dep_layer_used_flag is equal to 0, all the direct reference layer pictures of the current picture, which is specified by VPS syntax, may or may not be added to inter-layer reference picture set for a picture referring to the VPS. For example, in some embodiments, based on the indicator (e.g., if all_dep_layer_used_flag is equal to 0), the method may include not refraining from further signaling inter-layer reference picture information in any video slice associated with the at least one of the video parameter set (VPS), the sequence parameter set (SPS), or the picture parameter set (PPS).

At block 708, based on the indicator (e.g., if the indicator indicates that all associated direct reference layer pictures are added to the inter-layer reference picture set), the method 700 can include refraining from further signaling inter-layer reference picture information in any video slice associated with the at least one of the video parameter set (VPS), the sequence parameter set (SPS), or the picture parameter set (PPS). For example, in some embodiments, based on the indicator (e.g., if all_dep_layer_used_flag is equal to 1), the method 700 can include refraining from further signaling inter-layer reference picture information in any video slice associated with the at least one video parameter set (VPS), the sequence parameter set (SPS), or the picture parameter set (PPS).

Figure 8:
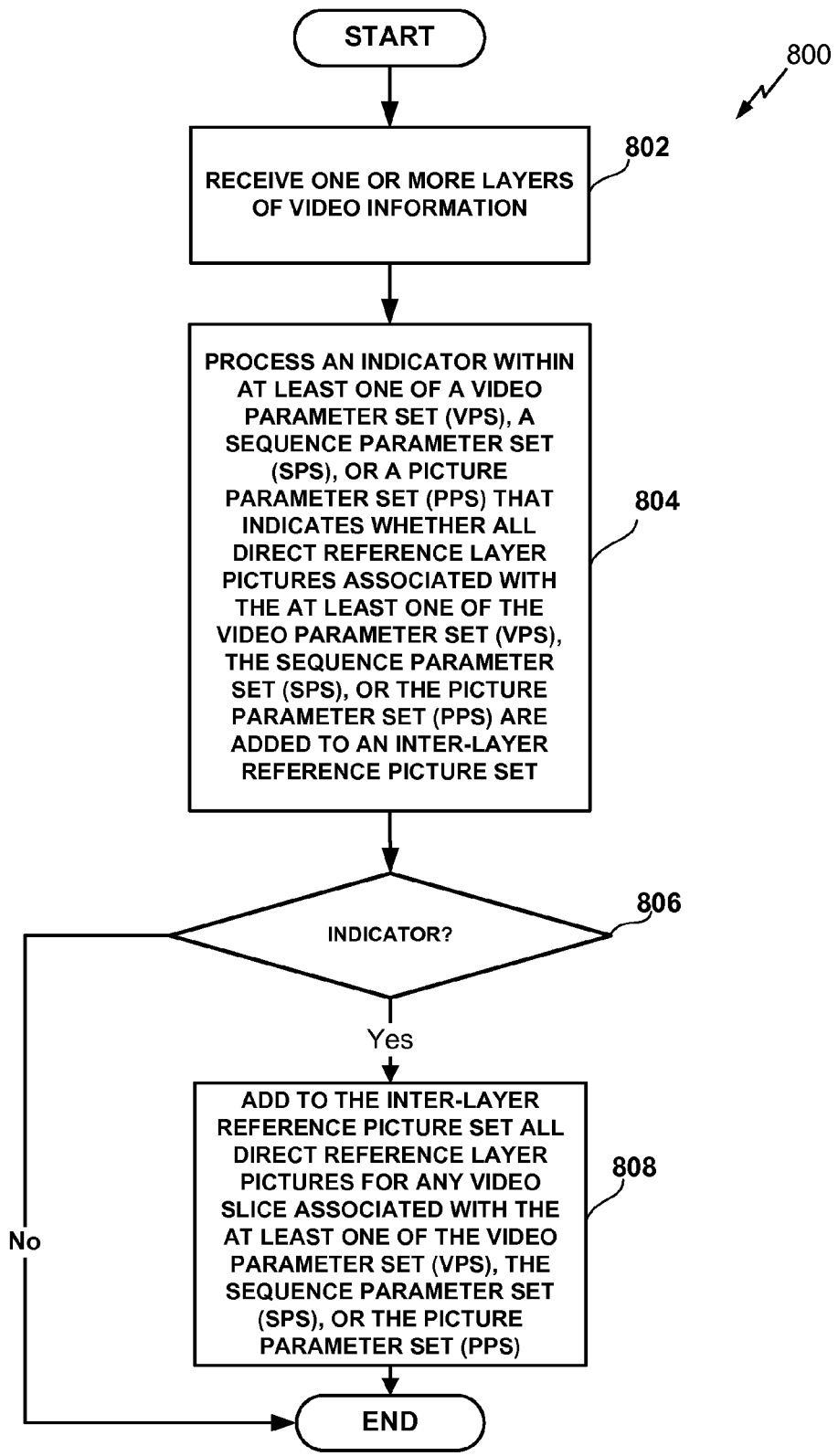
FIG. 8 illustrates a method for decoding video data according to an embodiment.

FIG. 8 illustrates an example method 800 for decoding video data according to an example embodiment. The method 800 can be performed by one or more components of video decoder 30, for example. In some embodiments, other components may be used to implement one or more of the steps described herein.

At block 802, one or more layers of video information can be received. Each layer can include at least one picture.

At block 804, an indicator can be processed within at least one of a video parameter set (VPS), a sequence parameter set (SPS), or a picture parameter set (PPS) that indicates whether all direct reference layer pictures associated with the at least one of the video parameter set (VPS), the sequence parameter set (SPS), or the picture parameter set (PPS) are added to an inter-layer reference picture set. For example, an indication of whether all the direct reference layer pictures are added to the inter-layer reference picture set (RPS) in the video parameter set (VPS) can be received within the VPS. With such an indication, all slices associated with the VPS are added to the inter-layer reference picture set without receiving syntax elements for inter-layer signaling in a slice header of any video slice. Alternatively, the indication can be received within the SPS or within the PPS. Accordingly, the constraint that all the direct reference layer pictures are added to the inter-layer RPS for any and all slices referring to (e.g., associated with) the SPS or the PPS similarly applies. In addition, the constraint that all the direct reference layer pictures are added to the inter-layer RPS can be introduced for MV-HEVC, such that the constraint may always apply. In some embodiments, an indicator such as all_dep_layer_used_flag can be processed that specifies or indicates whether all the direct reference layer pictures of the current picture, which may be specified by VPS syntax, are added to inter-layer reference picture set for each picture referring to the VPS.

At block 806, the value of the indicator may be evaluated. If not indicated by the indicator, the method 800 may end. For example, if an indicator such as all_dep_layer_used_flag is equal to 0, all the direct reference layer pictures of the current picture, which may be specified by VPS syntax, may or may not be added to inter-layer reference picture set for a picture referring to the VPS. For example, in some embodiments, if indicated by the indicator (e.g., if all_dep_layer_used_flag is equal to 0), the method may include not refraining from further signaling inter-layer reference picture information in any video slice associated with the at least one video parameter set (VPS), sequence parameter set (SPS), or picture parameter set (PPS).

At block 808, if indicated by the indicator, the method 800 can include adding to the inter-layer reference picture set all direct reference layer pictures for any video slice associated with the at least one video parameter set (VPS), sequence parameter set (SPS), or picture parameter set (PPS). For example, in some embodiments, if indicated by the indicator (e.g., if all_dep_layer_used_flag is equal to 1), the method 800 can include adding to the inter-layer reference picture set all direct reference layer pictures for any video slice associated with the at least one video parameter set (VPS), sequence parameter set (SPS), or picture parameter set (PPS).

Figure 9:
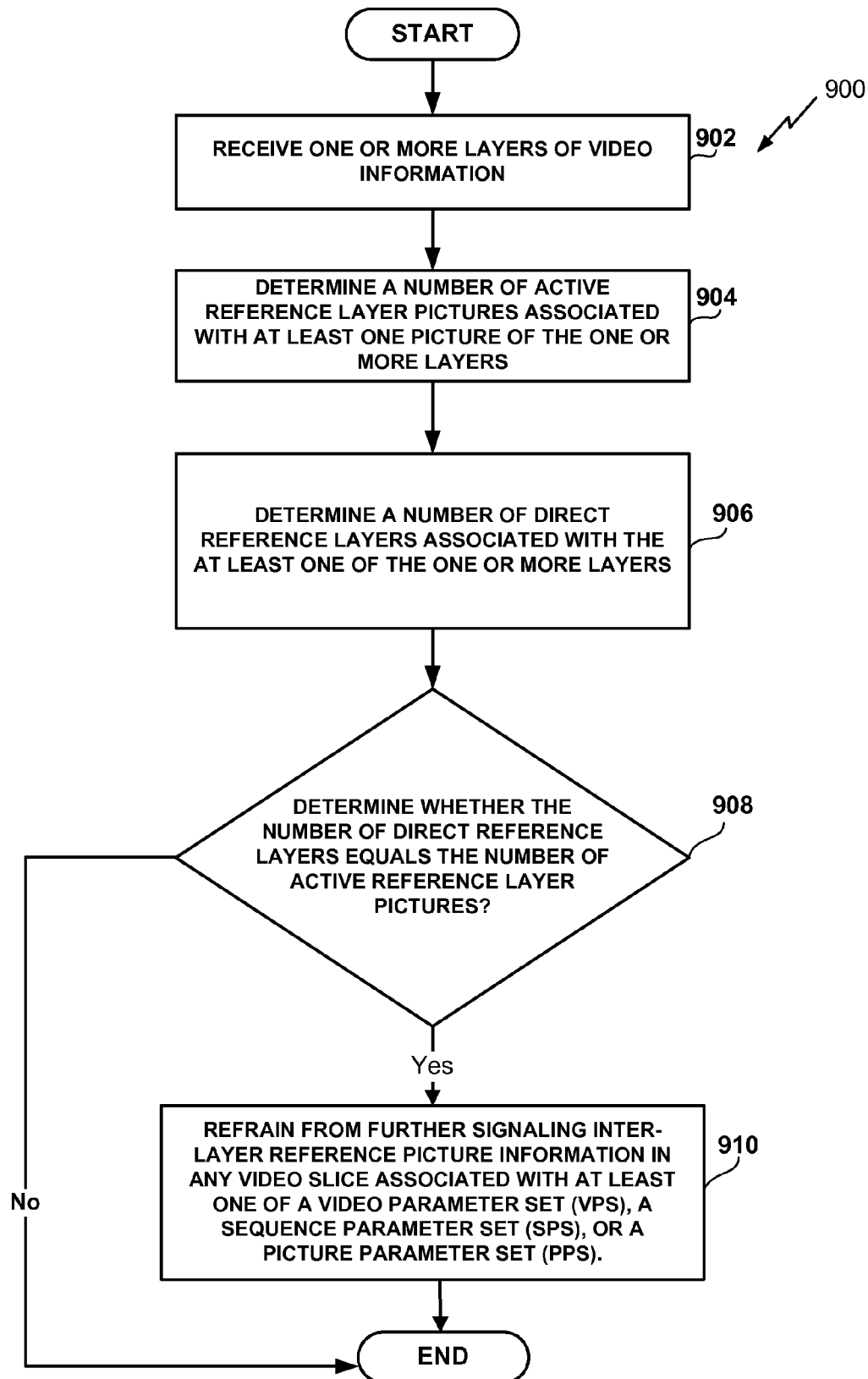
FIG. 9 illustrates an example method for encoding video data according to an embodiment.

FIG. 9 illustrates an example method 900 for encoding video data according to another embodiment. The method 900 can be performed by one or more components of video encoder 20, for example. In some embodiments, other components may be used to implement one or more of the steps described herein.

At block 902, one or more layers of video information can be received. Each layer can include at least one picture.

At block 904, a number of active reference layer pictures associated with at least one picture of the one or more layers can be determined. For example, a first indicator can be generated within at least one of a slice header or a picture parameter set (PPS) that specifies the number of active reference layer pictures. At block 906, a number of direct reference layers associated with the at least one of the one or more layers can be determined. For example, a second indicator can be generated within at least one of a video parameter set (VPS), a sequence parameter set (SPS), or the PPS that specifies the number of direct reference layers.

At block 908, the method 900 can include determining whether the number of direct reference layers equals the number of active reference layer pictures. Based on the number of direct reference layers equaling the number of active reference layer pictures, at block 910, the method 900 can include refraining from further signaling inter-layer reference picture information in any video slice associated with at least one of a video parameter set (VPS), a sequence parameter set (SPS), or a picture parameter set (PPS). For example, when NumDirectRefLayers[nuh_layer_id] is equal to NumActiveRefLayerPics, the method 900 can refrain from signaling inter-layer reference picture information. In particular, in some embodiments, when NumDirectRefLayers[nuh_layer_id] is equal to NumActiveRefLayerPics, inter_layer_pred_layer_idc[i] is not signalled.

Figure 10:
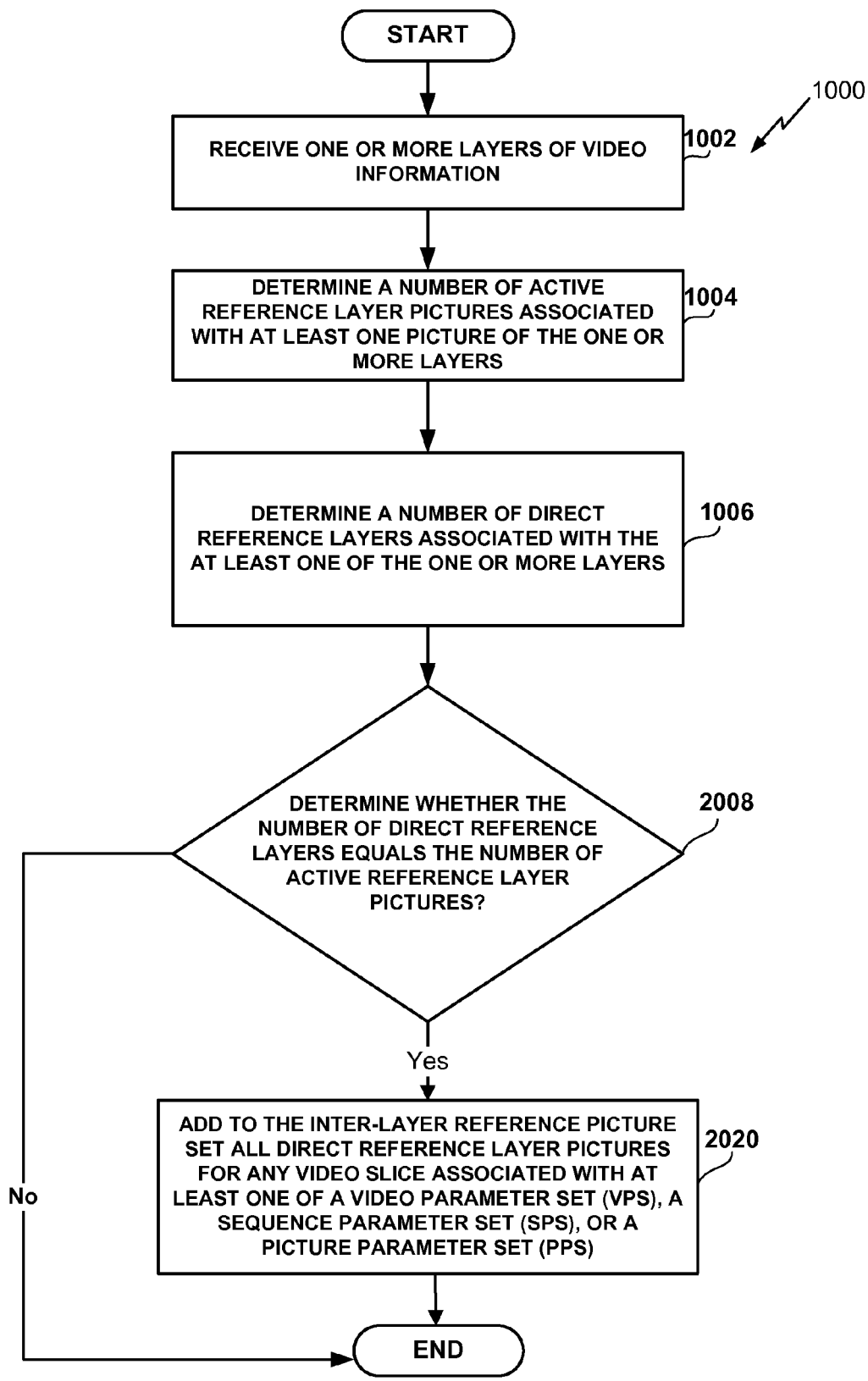
FIG. 10 illustrates a method for decoding video data according to an embodiment.

FIG. 10 illustrates an example method 1000 for decoding video data according to an embodiment. The method 1000 can be performed by one or more components of video decoder 30, for example. In some embodiments, other components may be used to implement one or more of the steps described herein.

At block 1002, one or more layers of video information can be received. Each layer can include at least one picture.

At block 1004, a number of active reference layer pictures associated with at least one picture of the one or more layers can be determined. For example, a first indicator can be received within at least one of a slice header or a picture parameter set (PPS) that specifies the number of active reference layer pictures. At block 1006, a number of direct reference layers associated with the at least one of the one or more layers can be determined. For example, a second indicator can be received within at least one of a video parameter set (VPS), a sequence parameter set (SPS), or the PPS that specifies the number of direct reference layers.

At block 1008, the method 1000 can include determining whether the number of direct reference layers equals the number of active reference layer pictures. Based on the number of direct reference layers equaling the number of active reference layer pictures, at block 1010, the method 1000 can include adding to the inter-layer reference picture set all direct reference layer pictures for any video slice associated with at least one of a video parameter set (VPS), a sequence parameter set (SPS), or a picture parameter set (PPS). For example, when NumDirectRefLayers[nuh_layer_id] is equal to NumActiveRefLayerPics, the method 1000 can determine inter-layer reference picture information. In particular, in some embodiments, when NumDirectRefLayers[nuh_layer_id] is equal to NumActiveRefLayerPics, inter_layer_pred_layer_idc[i] is determined by the decoder.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques can be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be

What is claimed is:

1. An apparatus for encoding video information, the apparatus comprising:
a memory configured to store one or more layers of video information, each layer comprising at least one picture; and
a processor operationally coupled to the memory and configured to:
signal a flag within a video parameter set (VPS) indicative of whether all direct reference layer pictures of a picture referring to the VPS are to be added to an inter-layer reference picture set (RPS) of the picture, wherein the flag has one of a first value or a second value, the first value indicating that all direct reference layer pictures of the picture are to be added to the inter-layer RPS of the picture, and the second value indicating that all direct reference layer pictures of the picture need not be added to the inter-layer RPS of the picture; and
based on an indication that all direct reference layer pictures of the picture are to be added to the inter-layer RPS of the picture, refrain from signaling, in any video slice associated with the picture, another flag indicative of whether inter-layer prediction may be used to decode the picture, wherein the picture is partitioned into one or more video slices and said another flag is not signaled with respect to any one of the one or more video slices of the picture.

2. The apparatus of claim 1, wherein said processor is further configured to refrain from signaling said another flag in a slice header of any video slice associated with the picture.

3. The apparatus of claim 1, wherein the direct reference layer pictures comprise pictures in layers specified in the VPS for each layer within each temporal sub-layer.

4. The apparatus of claim 1, wherein the apparatus comprises at least one of a digital television, a digital direct broadcast system, a wireless broadcast system, a personal digital assistant (PDA), a laptop or desktop computer, a digital camera, a digital recording device, a digital media player, a video gaming device, a video game console, a cellular or a satellite radio telephone, or a video teleconferencing device that comprises the memory and the processor.

5. An apparatus for decoding video information, the apparatus comprising:
a memory configured to store one or more layers of video information, each layer comprising at least one picture; and
a processor operationally coupled to the memory and configured to:
receive a flag within a video parameter set (VPS) indicative of whether all direct reference layer pictures of a picture referring to the VPS are to be added to an inter-layer reference picture set (RPS) of the picture, wherein the flag has one of a first value or a second value, the first value indicating that all direct reference layer pictures of the picture are to be added to the inter-layer RPS of the picture, and the second value indicating that all direct reference layer pictures of the picture need not be added to the inter-layer RPS of the picture; and
based on an indication that all direct reference layer pictures of the picture are to be added to the inter-layer RPS of the picture, refrain from processing, in any video slice associated with the picture, another flag indicative of whether inter-layer prediction may be used to decode the picture, wherein the picture is partitioned into one or more video slices and said another flag is not processed with respect to any one of the one or more video slices of the picture.

6. The apparatus of claim 5, wherein said processor is further configured to refrain from receiving said another flag in a slice header of any video slice associated with the picture.

7. The apparatus of claim 5, wherein the direct reference layer pictures comprise pictures in layers specified in the VPS for each layer within each temporal sub-layer.

8. The apparatus of claim 5, wherein the apparatus comprises at least one of a digital television, a digital direct broadcast system, a wireless broadcast system, a personal digital assistant (PDA), a laptop or desktop computer, a digital camera, a digital recording device, a digital media player, a video gaming device, a video game console, a cellular or a satellite radio telephone, or a video teleconferencing device that comprises the memory and the processor.

9. A method of encoding video information, the method comprising:
signaling, by a video encoder, a flag within a video parameter set (VPS) indicative of whether all direct reference layer pictures of a picture referring to the VPS are to be added to an inter-layer reference picture set (RPS) of the picture, wherein the flag has one of a first value or a second value, the first value indicating that all direct reference layer pictures of the picture are to be added to the inter-layer RPS of the picture, and the second value indicating that all direct reference layer pictures of the picture need not be added to the inter-layer RPS of the picture; and
based on an indication that all direct reference layer pictures of the picture are to be added to the inter-layer RPS of the picture, refraining from signaling, in any video slice associated with the picture, another flag indicative of whether inter-layer prediction may be used to decode the picture, wherein the picture is partitioned into one or more video slices and said another flag is not signaled with respect to any one of the one or more video slices of the picture.

10. The method of claim 9, further comprising refraining from including said another flag in a slice header of any video slice associated with the picture.

11. The method of claim 9, wherein the direct reference layer pictures comprise pictures in layers specified in the VPS for each layer within each temporal sub-layer.

12. A method of decoding video information, the method comprising:
receiving, by a video decoder, a flag within a video parameter set (VPS) indicative of whether all direct reference layer pictures of a picture referring to the VPS are to be added to an inter-layer reference picture set (RPS) of the picture, wherein the flag has one of a first value or a second value, the first value indicating that all direct reference layer pictures of the picture are to be added to the inter-layer RPS of the picture, and the second value indicating that all direct reference layer pictures of the picture need not be added to the inter-layer RPS of the picture; and
based on an indication that all direct reference layer pictures of the picture are to be added to the inter-layer RPS of the picture, refraining from processing, in any video slice associated with the picture, another flag indicative of whether inter-layer prediction may be used to decode the picture, wherein the picture is partitioned into one or more video slices and said another flag is not processed with respect to any one of the one or more video slices of the picture.

13. The method of claim 12, further comprising refraining from receiving said another flag in a slice header of any video slice associated with the picture.

14. The method of claim 12, wherein the direct reference layer pictures comprise pictures in layers specified in the VPS for each layer within each temporal sub-layer.

15. A video decoding apparatus, comprising:
  means for receiving a flag within a video parameter set (VPS) indicative of whether all direct reference layer pictures of a picture referring to the VPS are to be added to an inter-layer reference picture set (RPS) of the picture, wherein the flag has one of a first value or a second value, the first value indicating that all direct reference layer pictures of the picture are to be added to the inter-layer RPS of the picture, and the second value indicating that all direct reference layer pictures of the picture need not be added to the inter-layer RPS of the picture; and
  means for refraining, based on an indication that all direct reference layer pictures of the picture are to be added to the inter-layer RPS of the picture, from processing, in any video slice associated with the picture, another flag indicative of whether inter-layer prediction may be used to decode the picture, wherein the picture is partitioned into one or more video slices and said another flag is not processed with respect to any one of the one or more video slices of the picture.

16. A non-transitory computer readable medium having stored thereon code that when executed causes an apparatus to:
  receiving a flag within a video parameter set (VPS) indicative of whether all direct reference layer pictures of a picture referring to the VPS are to be added to an inter-layer reference picture set (RPS) of the picture, wherein the flag has one of a first value or a second value, the first value indicating that all direct reference layer pictures of the picture are to be added to the inter-layer RPS of the picture, and the second value indicating that all direct reference layer pictures of the picture need not be added to the inter-layer RPS of the picture; and
  based on an indication that all direct reference layer pictures of the picture are to be added to the inter-layer RPS of the picture, refrain from processing, in any video slice associated with the picture, another flag indicative of whether inter-layer prediction may be used to decode the picture, wherein the picture is partitioned into one or more video slices and said another flag is not processed with respect to any one of the one or more video slices of the picture.

* * * * *